United States Patent
Suh et al.

(10) Patent No.: US 9,079,461 B2
(45) Date of Patent: Jul. 14, 2015

(54) PREDICTIVE PEER-BASED TIRE HEALTH MONITORING

(71) Applicant: The Goodyear Tire & Rubber Company, Akron, OH (US)

(72) Inventors: Peter J. Suh, Copley, OH (US); Su Xu, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 140 days.

(21) Appl. No.: 13/828,124

(22) Filed: Mar. 14, 2013

(65) Prior Publication Data
US 2014/0277910 A1    Sep. 18, 2014

(51) Int. Cl.
*B60C 23/04*    (2006.01)
*B60C 23/02*    (2006.01)

(52) U.S. Cl.
CPC .............. *B60C 23/02* (2013.01); *B60C 23/0445* (2013.01); *B60C 23/0454* (2013.01); *B60C 23/0474* (2013.01); *B60C 23/0476* (2013.01); *B60C 23/0479* (2013.01); *B60C 23/0481* (2013.01)

(58) Field of Classification Search
USPC ................ 701/1, 32.8, 34.4; 73/146; 702/138
See application file for complete search history.

(56) References Cited

U.S. PATENT DOCUMENTS

| | | | |
|---|---|---|---|
| 4,773,011 A | 9/1988 | VanHoose | |
| 4,893,110 A | 1/1990 | Hebert | |
| 5,463,374 A | 10/1995 | Mendez et al. | |
| 5,656,993 A | 8/1997 | Coulthard | |
| 5,749,984 A | 5/1998 | Frey et al. | |
| 5,780,733 A | 7/1998 | Meunier | |
| 5,801,306 A | 9/1998 | Chamussy et al. | |
| 5,886,624 A | 3/1999 | Hebert | |
| 5,895,846 A | 4/1999 | Chamussy et al. | |
| 5,900,809 A | 5/1999 | Hebert | |
| 6,118,369 A | 9/2000 | Boesch | |
| 6,246,317 B1 * | 6/2001 | Pickornik et al. | ............. 340/447 |
| 6,636,790 B1 | 10/2003 | Lightner et al. | |
| 6,662,642 B2 | 12/2003 | Breed et al. | |
| 6,672,149 B2 | 1/2004 | Hottebart et al. | |
| 6,711,505 B2 | 3/2004 | Nakao | |

(Continued)

FOREIGN PATENT DOCUMENTS

| | | |
|---|---|---|
| EP | 1270275 A2 | 1/2003 |
| GB | 2429819 A | 3/2007 |

(Continued)

OTHER PUBLICATIONS

Integrated Vehicle Tire Pressure Monitoring for Commercial Vehicles, Wabco Vehicle Control Systems (2005).

(Continued)

*Primary Examiner* — Adam Tissot
(74) *Attorney, Agent, or Firm* — Wood, Herron & Evans, LLP

(57) ABSTRACT

A method, apparatus and program product determine a health condition for the tires on one or more vehicles by performing an individual self-comparison and a peer-based comparison for each tire, where the individual self-comparison reduces variances between the plurality of tires on the vehicle, and the peer-based comparison reduces variances within each tire. Anomalies, such as severe leakage and tire inflations may be detected, and slow leakages may be predicted based upon historical data associated with the health condition.

35 Claims, 31 Drawing Sheets

(56) References Cited

U.S. PATENT DOCUMENTS

| | | |
|---|---|---|
| 6,741,169 B2 | 5/2004 | Magiawala et al. |
| 6,809,637 B1 | 10/2004 | Brown |
| 6,836,708 B2 | 12/2004 | Tripathi |
| 6,868,358 B2 * | 3/2005 | Brown, Jr. .................. 702/138 |
| 6,876,908 B2 | 4/2005 | Cramer et al. |
| 6,879,893 B2 | 4/2005 | Woodard et al. |
| 6,879,938 B2 | 4/2005 | Asano et al. |
| 6,883,962 B2 | 4/2005 | Kurata |
| 6,917,285 B2 | 7/2005 | Boulot |
| 6,973,824 B2 | 12/2005 | Giustino et al. |
| 6,988,026 B2 | 1/2006 | Breed et al. |
| 7,009,507 B2 | 3/2006 | Naito |
| 7,043,973 B2 | 5/2006 | Shepherd et al. |
| 7,075,421 B1 | 7/2006 | Tuttle |
| 7,103,460 B1 | 9/2006 | Breed |
| 7,103,760 B1 | 9/2006 | Billington et al. |
| 7,221,262 B2 | 5/2007 | Kuchler |
| 7,272,536 B2 | 9/2007 | Potts |
| 7,301,445 B2 | 11/2007 | Moughler |
| 7,320,246 B2 | 1/2008 | Schick et al. |
| 7,323,975 B2 | 1/2008 | Hall et al. |
| 7,421,321 B2 | 9/2008 | Breed et al. |
| 7,444,210 B2 | 10/2008 | Breed et al. |
| 7,543,489 B2 | 6/2009 | Abe et al. |
| 7,555,370 B2 | 6/2009 | Breed et al. |
| 7,563,021 B2 | 7/2009 | Ichihara et al. |
| 7,594,433 B2 | 9/2009 | Bondu |
| 7,616,106 B2 | 11/2009 | Shoyama et al. |
| 7,630,802 B2 | 12/2009 | Breed |
| 7,657,504 B2 | 2/2010 | Jing et al. |
| 7,729,823 B2 | 6/2010 | Ruoppolo |
| 7,751,955 B2 | 7/2010 | Chinnadurai et al. |
| 7,783,507 B2 | 8/2010 | Schick et al. |
| 7,786,864 B1 | 8/2010 | Shostak et al. |
| 7,908,928 B2 | 3/2011 | Vik et al. |
| 8,009,027 B2 | 8/2011 | Thomas et al. |
| 8,011,236 B2 | 9/2011 | Branger |
| 8,494,704 B2 * | 7/2013 | Hall et al. .................. 235/375 |
| 2001/0002451 A1 | 5/2001 | Breed |
| 2002/0044050 A1 | 4/2002 | Derbyshire et al. |
| 2002/0075145 A1 | 6/2002 | Hardman et al. |
| 2002/0092345 A1 | 7/2002 | Van Niekerk et al. |
| 2002/0130771 A1 | 9/2002 | Osborne et al. |
| 2002/0143421 A1 | 10/2002 | Wetzer |
| 2003/0006893 A1 | 1/2003 | Dunbridge et al. |
| 2003/0009270 A1 | 1/2003 | Breed |
| 2003/0214394 A1 | 11/2003 | Behrendsen |
| 2004/0130442 A1 | 7/2004 | Breed et al. |
| 2005/0125117 A1 | 6/2005 | Breed |
| 2005/0192727 A1 | 9/2005 | Shostak et al. |
| 2005/0203683 A1 | 9/2005 | Olsen et al. |
| 2005/0273218 A1 | 12/2005 | Breed et al. |
| 2006/0010961 A1 | 1/2006 | Gibson et al. |
| 2006/0025897 A1 | 2/2006 | Shostak et al. |
| 2006/0071766 A1 * | 4/2006 | O'Brien et al. .................. 340/442 |
| 2006/0093015 A1 | 5/2006 | Ichihara et al. |
| 2006/0122747 A1 | 6/2006 | Brown |
| 2007/0013502 A1 | 1/2007 | Park et al. |
| 2007/0135179 A1 | 6/2007 | Hardman et al. |
| 2007/0186634 A1 * | 8/2007 | Burghardt et al. .................. 73/146 |
| 2007/0222568 A1 | 9/2007 | Morar et al. |
| 2007/0251310 A1 | 11/2007 | Pompier |
| 2007/0279203 A1 | 12/2007 | Thomas et al. |
| 2008/0018441 A1 | 1/2008 | Orrell |
| 2008/0046149 A1 | 2/2008 | Breed |
| 2008/0062004 A1 | 3/2008 | Hammerschmidt |
| 2009/0254240 A1 | 10/2009 | Olsen, III et al. |
| 2010/0185414 A1 | 7/2010 | Yamamoto |
| 2010/0207754 A1 | 8/2010 | Shostak et al. |
| 2010/0256946 A1 | 10/2010 | Carresjo et al. |
| 2011/0140876 A1 | 6/2011 | Deniau |
| 2011/0184669 A1 | 7/2011 | Liberge et al. |

FOREIGN PATENT DOCUMENTS

| | | |
|---|---|---|
| WO | 2009073945 A1 | 6/2009 |
| WO | 2012020166 A1 | 2/2012 |

OTHER PUBLICATIONS

O'Connor, Mary Catherine, Michelin Shrinks Its eTire Pressure Monitor, RFID Journal, Jan. 8, 2007.

European Search Report, European Search Report, Application No. 14159083.6-1760/2777957, dated Nov. 10, 2014.

X. Allan Zhong, Computational Fracture Mechanics Analysis of Truck Tire Durability, Journal of Applied Mechanics, Sep. 2006, vol. 73, 799.

* cited by examiner

PREDICTIVE PEER-BASED TIRE HEALTH MONITORING

FIELD OF THE INVENTION

The invention relates generally to tire monitoring and warning systems.

BACKGROUND OF THE INVENTION

It is well documented that maintaining a correct tire pressure improves handling, increases gas mileage, and extends the useful life of vehicle tires. Moreover, while such factors are important to the owners of individual passenger vehicles, for fleets of commercial vehicles such as tractor trailers, trucks, buses, vans, and other types of commercial vehicles, such factors may have a significant effect on profitability, both in terms of energy consumption costs and tire replacement and/or retread costs.

Despite its irrefutable importance, tire pressure may not be monitored and maintained frequently enough by many fleets, as well as many in the overall driving public. In addition, with the advent of "extended mobility tires" (EMT) and their increasingly widespread commercial presence, it may be difficult for a vehicle operator to detect a low pressure or leak condition and take appropriate action. As a result, extended use of a tire in a low pressure condition beyond the manufacturer's recommended limit may occur.

Various legislative approaches requiring the communication of tire pressure information to the operator of a vehicle have been proposed, including a mandate that new vehicles be equipped with a low tire pressure monitoring system. Conventional tire pressure monitoring systems (TPMS's) typically incorporate a sensor located on each tire in a vehicle to perform real-time interior air pressure and temperature monitoring. The information is wirelessly transmitted to the driver via radio band frequencies (RF) and displayed in the driver compartment of the vehicle. The remote sensing module typically includes a pressure sensor, a temperature sensor, a signal processor, and an RF transmitter, and may be powered by a battery. Alternatively, a sensing module may be "passive"; that is, power may be supplied to the sensing module by way of magnetic coupling with a remote transmitter. The receiver may either be dedicated to tire pressure monitoring or share other functions in the vehicle. For instance the receiver controller may be the existing dashboard controller or the body controller. The receiver itself may further be shared with other systems using the same frequency range such as a remote keyless entry system.

The purpose of a tire monitoring system is to provide the driver with a warning should an anomaly occur in one or more tires. In some instances, tire pressure and/or temperature may be reported and/or displayed, while in other instances a simple low pressure alert may be generated. To be useful, the information must be quickly communicated and be reliable. However, displaying data derived from raw sensor measurements of temperature and pressure is not always sufficient to accurately represent the status of a tire at any given time and at various loads and conditions. The interpretation of measured data relating to temperature and pressure, therefore, is important, but has heretofore been problematic. Temperature and pressure readings by sensors in communication with a tire under conditions of actual use are influenced by various factors including heat emitted by the brakes; the thermal dissipation from the tire to the rim; load transfers that cause slight variations of the volume of the tires; and heat build-up in the tire due to its hysteretic losses. Such factors can affect the accuracy of information communicated to the driver, failing to alert the driver of marginal tire conditions under some circumstances and issuing false alarms to the driver in other instances.

Timeliness is also a concern with respect to conventional tire monitoring systems. Alerts to a driver of a low tire pressure condition may be based on simple thresholds, and once the driver is alerted due to the pressure falling below a threshold, the tire has already reached a non-optimal state. Leakages in a tire may be slow or fast, and particularly for faster leaks, the alert to the driver may be too late to enable the driver to rectify the situation without causing a tire failure or having to immediately stop the vehicle and change the tire or call for roadside assistance.

Consequently, a need exists in the art for processing information in a tire pressure monitoring system in an accurate and timely manner.

Furthermore, with respect to commercial vehicles, oftentimes the vehicles have more tires, travel greater distances, and thus a greater likelihood of tire failure, as well as typically a greater difficulty in resolving tire issues while in transit. For over-the-road tractor trailers, for example, the nearest service center may be tens of miles away and in many cases, a service vehicle will need to be dispatched to provide roadside assistance. In addition, from the perspective of a fleet, coordinating the service and maintenance of multiple fleet vehicles compounds these risks.

Therefore, a need also exists in the art for a tire monitoring system capable of reducing vehicle downtime, improving fuel economy, and reducing tire costs associated with fleets and the commercial vehicles used thereby.

SUMMARY OF THE INVENTION

The invention addresses these and other problems associated with the prior art by providing a method, apparatus and program product that monitor health conditions of tires on a vehicle using a combination of individual self-comparison and peer-based comparison. The individual self-comparison reduces variances between the tires on a vehicle, while the peer-based comparison reduces variances within each tire. Anomalies, such as severe leakage and tire inflations, may also be detected, and slow leakages may be predicted based upon historical data associated with the determined health condition.

Therefore, consistent with one aspect of the invention, vehicle tires may be monitored by receiving tire data associated with a plurality of tires on a vehicle, and determining a health condition for each of the plurality of tires by performing an individual self-comparison and a peer-based comparison of the tire data for each tire. The individual self-comparison reduces variances between the plurality of tires on the vehicle, and the peer-based comparison reduces variances within each tire.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention monitor health conditions of tires on a vehicle using a combination of individual self-comparison and peer-based comparison.

The individual self-comparison reduces variances between the tires on a vehicle, and in this regard, individual self-comparison may be considered to include various methodologies utilized to compare the current condition of a tire against what is considered to be a normal operating condition for the tire. As will become more apparent below, what is considered a normal operating condition for a tire is typically not tied to a fixed level of inflation, for example, as a tire may be inflated to a range of pressures, yet still be considered in normal operating condition. In one embodiment, for example, an individual self-comparison may compare the pressure of a tire against a mean pressure for tire calculated during training of a tire-specific model for the tire, taken when the tire is assumed to be operating under normal operating conditions.

The peer-based comparison reduces variances within each tire, and may be considered to include various methodologies utilized to compare the current condition of a tire against the current conditions of the other tires on the same vehicle, with an assumption being made that all of the tires on the vehicle are subjected to roughly the same operating conditions. As such, differences detected in a particular tire from the other tires on the vehicle, e.g., as represented by a mean or median of the all or a subset of the tires on the vehicle, may be indicative of a poor health condition for the tire, or another potential anomaly associated with the tire.

By combining individual self-comparison and peer-based comparison, the various tires on a vehicle may effectively be normalized to the same "normal" value during training based on the current conditions of the tires during training, rather than any particular predefined "normal" values. Then, during testing or monitoring, the combination of individual self-comparison and peer-based comparison may be used to isolate particular vehicle tires that differ from other tires on the vehicle, such that, despite the current operating conditions of the vehicle, e.g., due to ambient temperature and/or tire temperature, or whether the vehicle is sitting still or in operation, tires with poor health conditions may be identified.

In further embodiments, anomalies, such as severe leakage and tire inflations, may also be detected, and may, for example, trigger retraining of tire-specific models, e.g., when the inflation of one or more tires is detected. In addition, in some embodiments, a predictive algorithm may be used to predict a leakage rate of a tire, e.g., so that a time before re-inflation or repair of the tire is required may be calculated.

Other variations and modifications will be apparent to one of ordinary skill in the art.

Hardware and Software Environment

Figure 1:
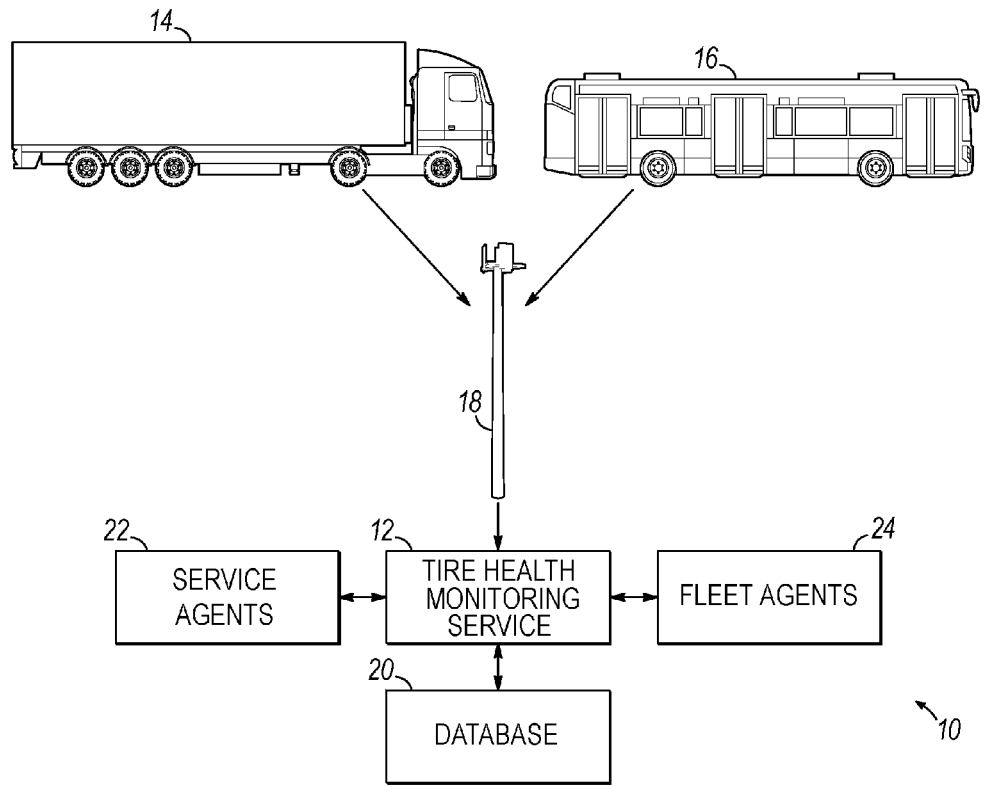
FIG. 1 is a block diagram of a tire health monitoring system consistent with the invention.

Turning now to the drawings, wherein like numbers denote like parts throughout the several views, FIG. 1 illustrates an exemplary tire health monitoring system 10 implemented as a tire health monitoring service 12 capable of monitoring a plurality of vehicles, e.g., a tractor trailer 14 and a bus 16. It will be appreciated that service 12 may be capable of monitoring the tires of practically any type of vehicle, including, for example, passenger vehicles, cars, trucks, vans, construction equipment, agricultural equipment, buses, etc., so the invention is not limited to the particular vehicles illustrated in FIG. 1.

Service 12 wirelessly communicates with vehicles 14, 16 via a network 18, e.g., via a wireless carrier, which may be operated by the same entity that operates service 12, or by a separate entity altogether, and may be public, private or proprietary in nature. Service 12 may be coupled to network 18 by wired and/or wireless communication media.

Service 12 is coupled to a database 20 that is used to store tire pressure monitoring system (TPMS) data retrieved from vehicles 14, 16, e.g., pressure, temperature, a vehicle identifier, a tire identifier, a wheel identifier, location data and/or a timestamp. Moreover, as will be discussed in greater detail below, service 12 may be accessed by various entities, including, for example, service agents 22 that are either agents of the provider of service 12 or authorized representatives thereof, e.g., authorized dealers and/or service centers. Moreover, in some embodiments that monitor on behalf of fleets of vehicles, fleet agents 24 may also be provided with access to service 12. Additional interfaces, e.g., for vehicle operators or owners, administrators, etc., may also be provided in some embodiments of the invention.

Figure 2:
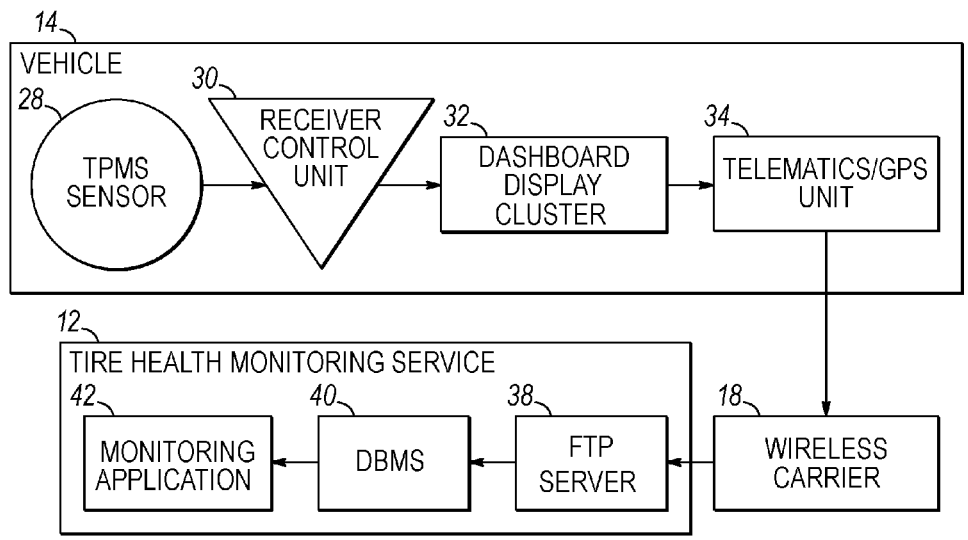
FIG. 2 is a block diagram illustrating the flow of data between components in the tire health monitoring system of FIG. 1.

FIG. 2 illustrates in greater detail the components in system 10 used to retrieve, communicate and process TPMS data. For example, on vehicle 14, a plurality of TPMS sensors 28 may be installed on each tire/wheel of the vehicle, and configured to communicate TPMS data to a receiver control unit (RCU) 30 disposed on the vehicle. The typical locations of these components are illustrated graphically by corresponding circles and inverted triangles in FIG. 1, and it will be appreciated that multiple RCU's 30 may be disposed in different locations on a vehicle in order to communicate with proximate TPMS sensors 28.

Each RCU 30 typically outputs the TPMS data to a dashboard display cluster 32 on vehicle 14, which may perform some processing of the TPMS data and may report such data to an operator, e.g., pressure readings, temperature readings, and/or low pressure and/or temperature alerts. Cluster 32 may be a programmable electronic or computer device incorporating audio and/or visual indicators or displays, and may be integrated with other on-board electronic components. In some embodiments, e.g., where no central monitoring service is used, a peer-based predictive algorithm as disclosed herein may be performed locally in vehicle 14, e.g., within cluster 32 or another on-board electronic component.

In the illustrated embodiment that does incorporate central monitoring, vehicle 14 also includes a telematics/GPS unit 34 that communicates with wireless carrier 18 to communicate TPMS data to service 12. Unit 34 may be configured to output location data generated by an integrated GPS receiver as well as additional data collected by sensors 28. It will be appreciated that the data communicated by unit 34 may be pre-processed in some embodiments or may be raw data. Furthermore, the protocol by which data is communicated to wireless carrier 18 may vary in different embodiments. Furthermore, in some embodiments, GPS sensing may be omitted. In addition, in some embodiments, bi-directional communication may be supported such that, for example, service 12 may provide the operator of vehicle 14 with alerts or status information, and may provide a mechanism by which an operator may be put into communication with a service agent, e.g., via electronic message, voice and/or video communications to address any alert conditions or coordinate service of the vehicle.

Wireless carrier 18 provides TPMS and other data provided by unit 34 to service 12, e.g., by interfacing with an FTP server 38. Server 38 passes the incoming data to a database management system 40 to log the incoming data in database 20. This data is then monitored and processed by a monitoring application 42, in the manner discussed in greater detail below.

Figure 3:
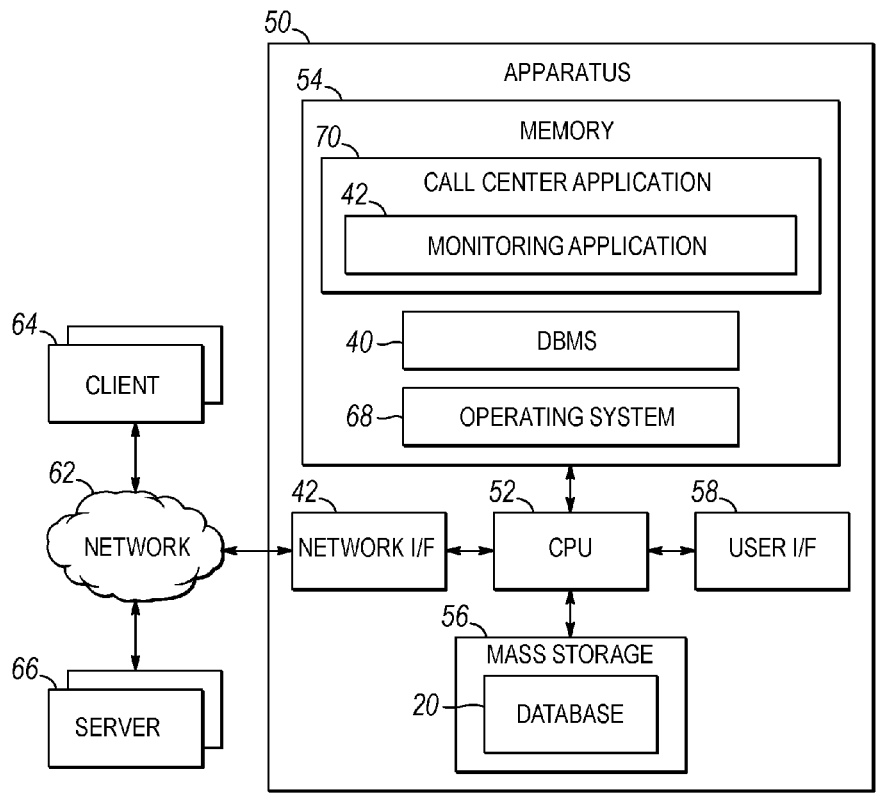
FIG. 3 is a block diagram of an exemplary hardware and software environment suitable for implementing the tire health monitoring system of FIG. 1.

Now turning to FIG. 3, an exemplary hardware and software implementation of service 12, within an apparatus 50, is illustrated. For the purposes of the invention, apparatus 50 may represent practically any type of computer, computer system or other programmable electronic device, and will be referred to hereinafter as a computer for simplicity. It will be appreciated, however, that apparatus 50 may be implemented using one or more networked computers, e.g., in a cluster or other distributed computing system, or may be implemented within a single computer or other programmable electronic device, e.g., a desktop computer, laptop computer, handheld computer, cell phone, set top box, etc.

Computer 50 typically includes a central processing unit 52 including at least one microprocessor coupled to a memory 54, which may represent the random access memory (RAM) devices comprising the main storage of computer 50, as well as any supplemental levels of memory, e.g., cache memories, non-volatile or backup memories (e.g., programmable or flash memories), read-only memories, etc. In addition, memory 54 may be considered to include memory storage physically located elsewhere in computer 50, e.g., any cache memory in a processor in CPU 52, as well as any storage capacity used as a virtual memory, e.g., as stored on a mass storage device 56 or on another computer coupled to computer 50. Computer 50 also typically receives a number of inputs and outputs for communicating information externally. For interface with a user or operator, computer 50 typically includes a user interface 58 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 50 may also include one or more mass storage devices 56, e.g., a floppy or other removable disk drive, a hard disk drive, a direct access storage device (DASD), an optical drive (e.g., a CD drive, a DVD drive, etc.), and/or a tape drive, among others. Furthermore, computer 50 may include an interface 60 with one or more networks 62 (e.g., a LAN, a WAN, a wireless network, and/or the Internet, among others) to permit the communication of information with other computers and electronic devices, e.g., one or more client computers 64 (e.g., for interfacing with agents 22, 24) and one or more servers 66 (e.g., implementing other aspects of service 12). It should be appreciated that computer 50 typically includes suitable analog and/or digital interfaces between CPU 52 and each of components 54, 56, 58 and 60 as is well known in the art. Other hardware environments are contemplated within the context of the invention.

Computer 50 operates under the control of an operating system 68 and executes or otherwise relies upon various computer software applications, components, programs, objects, modules, data structures, etc., e.g., a call center application 70 (within which, for example, monitoring application 42 may be implemented). Moreover, various applications, components, programs, objects, modules, etc. may also execute on one or more processors in another computer coupled to computer 50 via network 62, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by computer 50. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1-3 is not intended to limit the present invention. Indeed, those skilled in the art will recognize that other alternative hardware and/or software environments may be used without departing from the scope of the invention.

Predictive Peer-Based Tire Health Monitoring

Embodiments consistent with the invention utilize predictive peer-based tire health monitoring to monitor the health of the tires on a particular vehicle. One such implementation of predictive peer-based tire health monitoring, specifically in the application of a centralized tire health monitoring service suitable for monitoring the health of tires from one or more fleets of commercial vehicles, e.g., trucks, is illustrated by process 100 in FIG. 4.

Process 100 includes six primary steps: initialization 102, data acquisition 104, data preprocessing 106, health assessment 108, anomaly detection and diagnosis 110, and leakage prediction 112, each of which will be discussed in greater detail below. Steps 104-112, and in some instances, all or a portion of the operations performed in step 102, are typically implemented in a computer, e.g., via software and/or hardware such as within monitoring application 42 of FIGS. 2-3. In some embodiments, all or a portion of the functionality in these steps may be implemented in an on-board computer or programmable electronic device disposed on the vehicle, or in other manners that will be appreciated by one of ordinary skill in the art having the benefit of the instant disclosure.

Initialization step 102 is performed when the tire health monitoring system is applied to the tires for the first time to ensure that all tires on the vehicle have no leakage. As will become more apparent hereinafter, the system typically needs to be trained by data that is collected when tires are in good condition, and as such, any leakage in a tire would violate this condition and lead to poor model parameters, and thus, poor model accuracy. As such, in step 102, a tire check is performed in block 114 to ensure that all tires are in good condition, and based upon whether all tires are good, block 116 either proceeds to block 118 to initiate a tire maintenance operation to either replace or repair any faulty tires and retry the initial tire check, or to step 104 to begin monitoring. It will be appreciated that tire checks and/or tire maintenance operations may be performed manually and/or automatically in various embodiments of the invention. For example, in one embodiment a tire check may be performed by acquiring TPMS data for tires over a time period when the vehicle is known to be stopped to test for any leakages.

Once the system is initialized and all tires for a vehicle have been verified to be good, monitoring may be established for the vehicle, such that TPMS data may be sent periodically to the tire health monitoring service, either only when the vehicle is operational, or alternatively at all times and regardless of the operational status of the vehicle. Box 120 of FIG. 1 illustrates the operations performed in response to each new package of TPMS data received by the tire monitoring service.

In step 104, for example, a package of TPMS data, collected and transmitted by the on-board components discussed above in connection with FIG. 2, may be acquired by the tire health monitoring service. Each package may include, for example, the current temperature and pressure of all tires from one vehicle, along with additional data such as a data collection time stamp and GPS location. For an over-the road tractor trailer, for example, a package may include pressure and temperature data for all 18 tires.

Next, in step 106, the collected data is preprocessed. It has been found that the collected data may sometimes include unexpected outliers that are not in the normal range of the values, or do not match the context values. These outliers could potentially contaminate the later model accuracy if not removed, and as such, step 106 may preprocess all received data to ensure that the data is clean. Then, additional preprocessing in the form of compensating for temperature, e.g., via a physical model, may be performed. In one embodiment, for example, the preprocessing of collected data may be used to generate a compensated pressure variable, representative of the tire pressure compensated for temperature effects.

Next, as illustrated by blocks 108 and 110 health assessment and anomaly detection and diagnosis operations may be performed using the collected and preprocessed data. In block 108, each health assessment iteration initially checks a system mode to determine if a model training process has been performed (block 122). In particular, embodiments consistent with the invention utilize a vehicle-specific tire health assessment model to monitor the tires of a particular vehicle, and the model typically must be trained prior to operational use. Thus, the model may alternate between training and operational modes.

Thus, if a training mode is detected in block 122, control passes to block 124 to train a tire health assessment model 126 by updating model parameters generated from historical data according to the latest data received. If an operational or testing mode is detected, block 122 instead passes control to a health value generation block 128 to generate a health value (HV) for each tire as the output from health assessment step 108. Several operations, e.g., individual self-tire comparison, peer-based comparison, etc. are performed in block 128 to generate a more accurate health value. These operations are discussed in greater detail below.

Anomaly detection and diagnosis step 110 receives the health values from health assessment step 108 and determines in block 130 whether any anomalies have been detected. In the illustrated embodiment, anomalies to the system such as tire inflations are designed to be auto-detectable. If no such anomalies are detected, control passes to block 132 to determine whether all health values are "normal," i.e., within a range considered to represent a non-leaking and sufficiently pressurized tire. If not, control passes to block 134 to indicate a potential slow leakage condition. Otherwise, if the health values are normal, control returns to step 104 to process any additional packages of TPMS data awaiting processing.

Returning to block 130, whenever a system anomaly is detected, the anomaly will be classified into various groups following different separation rules. Block 136, for example, determines whether an anomaly is caused by inflation rather than severe leakage. If so, control passes to block 138 to select the training mode so that the relevant health assessment model will be retrained based on the data received after the inflation. If instead a severe leakage is the cause of an anomaly, control passes to block 140 to generate an urgent event to notify a service provider agent, the vehicle operator, a fleet agent, and/or other interested party.

Returning to block 134, if a slow leakage is detected in step 110, control passes to step 112 to initiate a prediction operation to predict based on the historical data in the model the possible time that the tire could operate until it reaches a predetermined threshold at which the tire is no longer suitable for operational use. Further details regarding the prediction operation will be discussed hereinafter.

In addition, as illustrated in blocks 142-144, a recovery check may be performed in each iteration in block 142 to determine if any tires that have previously been determined to be leaking have been fixed based upon the data trend. If so, control passes to block 144 to set the mode to training for the tire. Otherwise, block 144 is bypassed.

Prior to elaborating further on the aforementioned steps, a number of assumptions may be relied upon for the performance of predictive peer-based tire health monitoring consistent with the invention. First, it is assumed that during tire operation, the volume of a tire cavity does not significantly change, i.e. the change is typically negligible. Thus the cavity volume can be taken as a constant number.

Second, an assumption may be made that the data behaves similarly at any time as long as the data is taken from the same tire that is in good condition. Data-driven statistical models usually are trained by data taken from the system when its health condition is good, and test the future data to determine if the new data is subjected to the same distribution so that if not, the new data will be considered to represent a bad health of the system. Therefore, if this assumption cannot be met, then some of the testing data is subjected to another distribution, and the model will automatically treat it as a negative health indication.

Third, after tire maintenances, such as inflation or fixation, it may be assumed that tire pressures are maintained in the normal range. It also may be assumed that before the first system initialization, none of the tires has any abnormal leakage (a condition that is tested in step 102 of FIG. 4). In some embodiments, such scenarios may also be detected by simply setting thresholds on pressure data.

Fourth, an assumption may be made that all of the tires from a vehicle such as a tractor trailer share a similar operating condition in terms of road surface roughness, ambient temperature, ambient air pressure, normal slow leakage rate, etc. This assumption facilitates the application of peer-based health condition comparison as will be discussed in greater detail below.

Fifth, it may be assumed that during normal operation, more than half of the tires from a vehicle are in good condition, i.e., less than half of the tires will have leakage at any given time. This assumption facilitates the selection of the most normal value from all tires to be the nominal value that all other values may be compared to.

Sixth, an assumption may be made that the possibility of two tires from one vehicle experiencing severe leakage simultaneously is very low.

Figure 4:
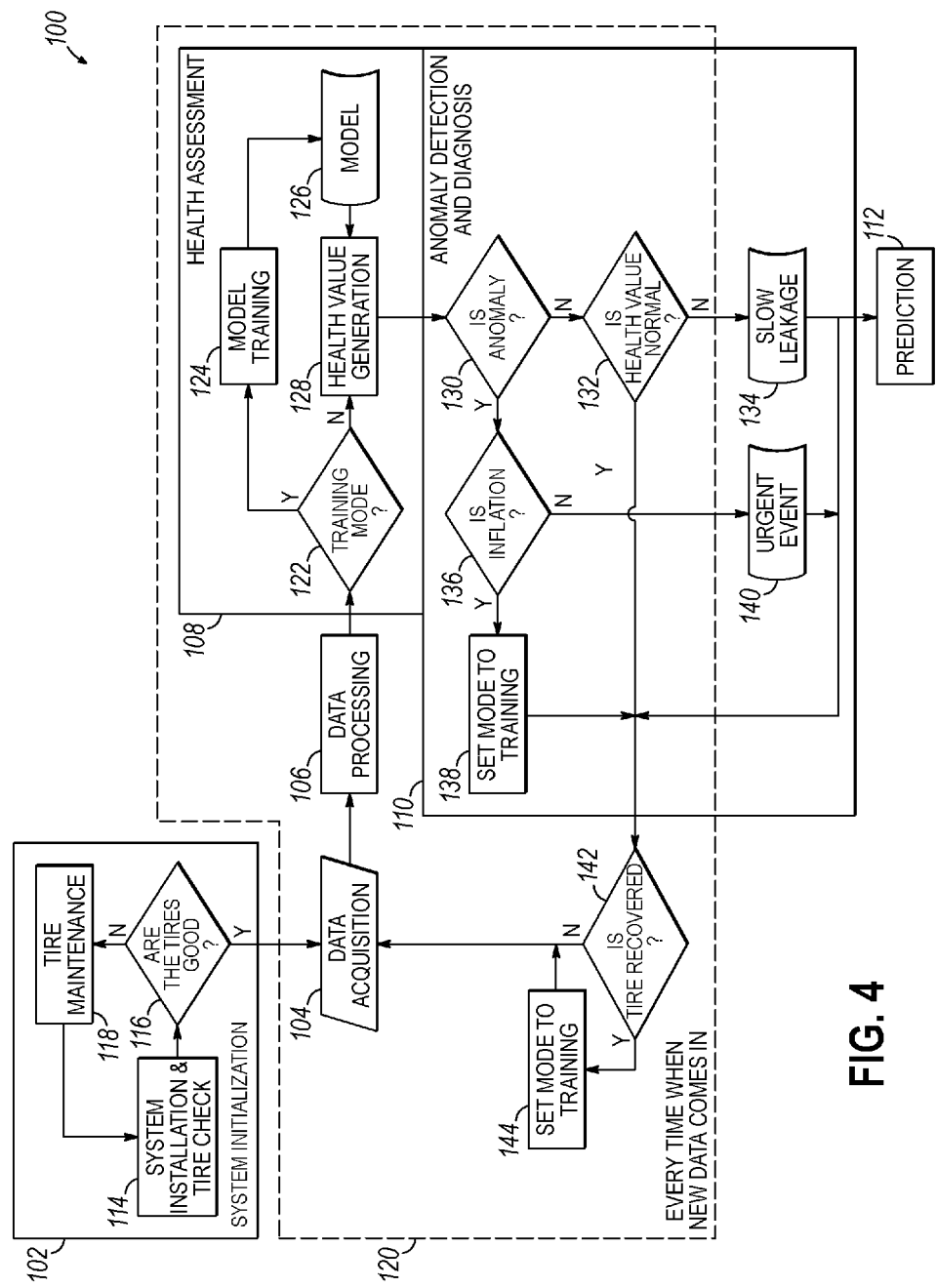
FIG. 4 is a flowchart illustrating an exemplary sequence of steps performed by the tire health monitoring application referenced in FIG. 3.

Further details regarding a number of the steps illustrated in FIG. 4, and utilizing the assumptions outlined above, are provided below.

Data Preprocessing

Figure 5:
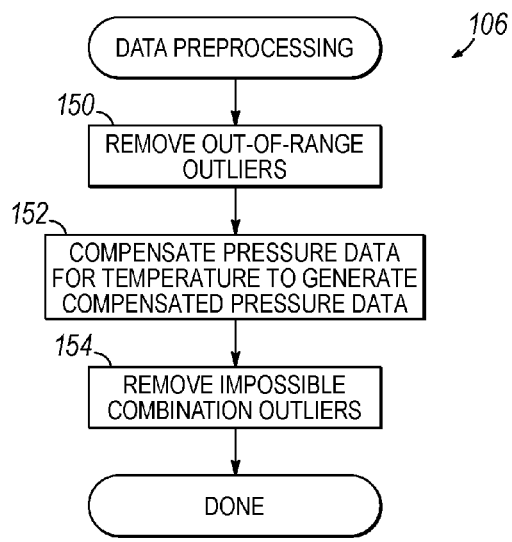
FIG. 5 is a flowchart illustrating an exemplary sequence of steps performed by the data preprocessing step referenced in FIG. 4.

Now turning to FIG. 5, this figure illustrates steps that may be performed in data preprocessing step 106 in greater detail. It has been found that data acquisition methods are often imperfect, resulting in problems such as out-of-range values and impossible data combinations, and analyzing data without an appropriate data cleaning process could cause misleading results. Embodiments consistent with the invention, however, may preprocess incoming data by first, in block 150, removing out-of-range outliers, second, in block 152, compensating the pressure data for temperature effects, and third, in block 154, removing impossible combination outliers.

Figure 6:
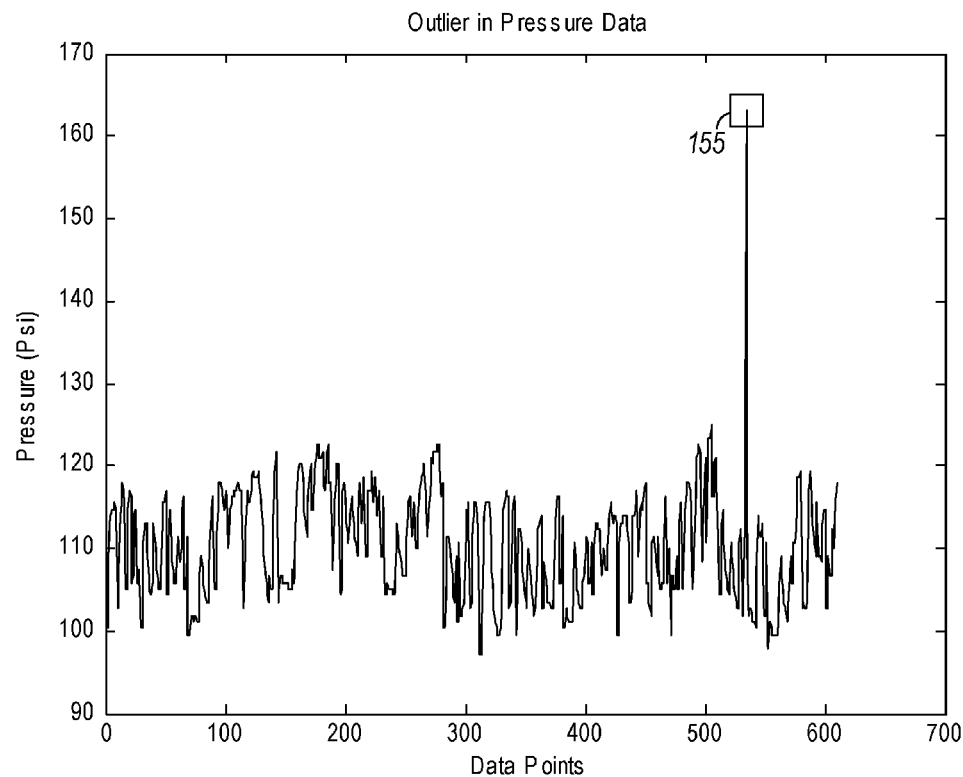
FIG. 6 is a graph of raw pressure for an example data set, and illustrating an out-of-range outlier data point.

From the perspective of outliers, it has been found that there are two primary types of outliers that can be observed from raw TPMS data. The first is an out-of-range value, which may be considered a data point that contains a value that is out of the normal range. In one embodiment, for example, the differences between two consecutive data points may be calculated, and if the difference value is beyond a pre-determined threshold, then this data point may be removed. FIG. 6, for example, illustrates at 155 a pressure reading up to 160 psi that is far above what would be considered a normal range (e.g., for a typical truck tire, the normal range might be 90-130 psi), and that would be suitable for removal from the dataset.

The second type of outlier is defined as an "impossible data combination" outlier, which may be considered to incorporate where all variables are in their own normal ranges respectively, but as a data package or a combination of all variables, the data value is unreasonable. It has been found, for example, that outlier pressure and temperature values may be present in raw data but still fall within normal pressure and temperature ranges, so in some embodiments a combination of these two variables may be used to evaluate the values together to detect impossible combination outliers.

In the illustrated embodiments, in particular, a compensated pressure is calculated to standardize pressure measurements to a constant temperature.

Traditionally, it has been recommended to take pressure readings for tires when the tires are "cold", i.e., having not been used for some time. If a tire has been driving even for several minutes, the inner tire temperature typically increases to a point that a measurable effect on pressure is experienced. However, TPMS sensors often take measurements after tires start to rotate, so almost all pressure data collected from a TPMS sensor typically includes some temperature effect. Further, when temperature and pressure are plotted together, a high linear correlation, e.g., around 0.96 correlation coefficient, is often observed.

The ideal gas law PV=nRT may be used to compensate pressure for temperature. If it is assumed that a tire is a fixed, confined volume, with any change in tire size due to deflation considered to be negligible, then the ideal gas law may be rewritten as:

$$\frac{P}{T} = \frac{nR}{V}$$

with all of the values on the right side of the equation being fixed, in which case pressure is shown to be proportional to temperature. Thus, by introducing two new values, C, compensated pressure, and $T_0$, nominal temperature, the following relationship may be established:

$$\frac{P}{T} = \frac{nR}{V} = \frac{C}{T_0}$$

By selecting a pre-determined fixed value such as 25 degrees Celsius for the nominal temperature $T_0$, for each pressure and temperature pair collected from the TPMS system, a unique corresponding compensated pressure may be generated corresponding to the temperature at 25 degrees Celsius. By making this transformation, ideally the temperature effect would be entirely eliminated from the compensated pressure and the compensated pressure would be a flat line if a tire has no leakage at all. It is believed, however, that compensated pressure may still have fluctuations due to environmental factors such as where TPMS sensors are mounted on rims. The measured temperature is taken as cavity temperature while it is actually cavity close to wheel temperature, and a variance may exist between the actual cavity temperature and cavity close to wheel temperature. Moreover, this variance may also be affected by ambient temperature. As such, some variance may still be expected in a compensated pressure value.

Figure 7A:
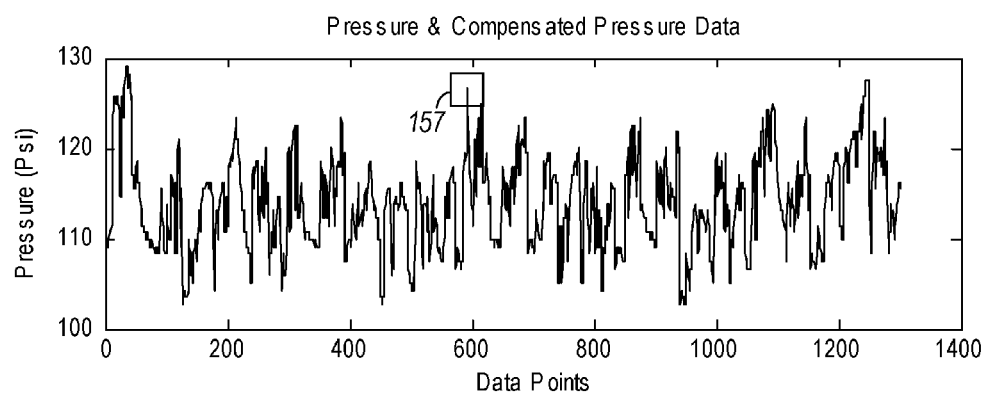
FIGS. 7A and 7B are graphs comparing raw and compensated pressure for an example data set, and illustrating an impossible data combination outlier data point.
Figure 7B:
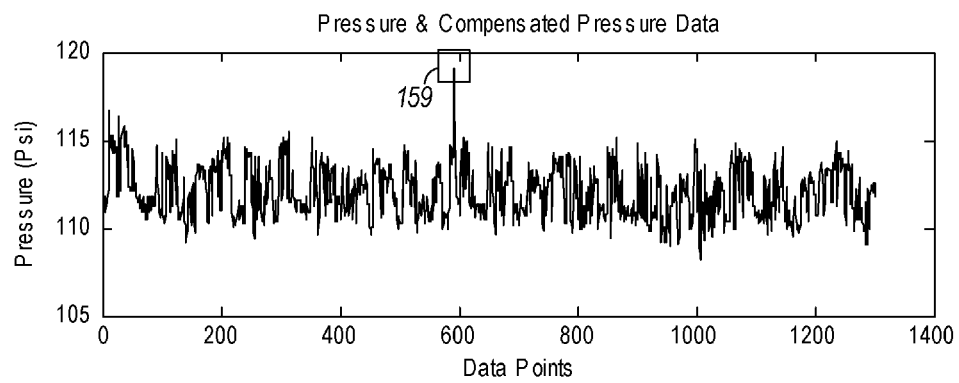

It has been found that after temperature compensation, impossible combination outliers may be more readily identified. FIGS. 7A and 7B, for example, respectively illustrate pressure and compensated pressure values for a tire. As shown at 157 in FIG. 7A, an outlier pressure reading may not itself fall outside of normal readings, but as shown at 159 in FIG. 7B, when that pressure value is compensated for temperature, the resulting compensated pressure value is more readily identified as an outlier, and thus may be discarded.

Health Assessment

Now returning to FIG. 4 and health assessment step 108, in the illustrated embodiment it may be desirable to generate a single value or set of values indicative of tire health in order to estimate the overall health of a vehicle. Since vehicles will typically maintain a regular health condition most of the time, it may be desirable to minimize how often fault diagnosis and prediction steps, which might otherwise incur substantial computational costs, are executed. Thus, by performing health assessment as a separate and preliminary step to fault diagnosis and prediction, such fault diagnosis and prediction may be deferred until an initial indication of a new potential fault is detected. In other embodiments, however, fault diagnosis and/or prediction may be performed more frequently.

Health assessment model 126, as noted above, operates in training and testing modes. Training typically utilizes data from healthy conditions, so a baseline of the system is described. Then, during testing, new data is compared with the trained baseline. If the testing samples are similar to the baseline, then a good health condition of the system may be concluded, otherwise, the system condition is not acceptable and some maintenance actions including fault diagnosis and prediction may be triggered.

Figure 8:
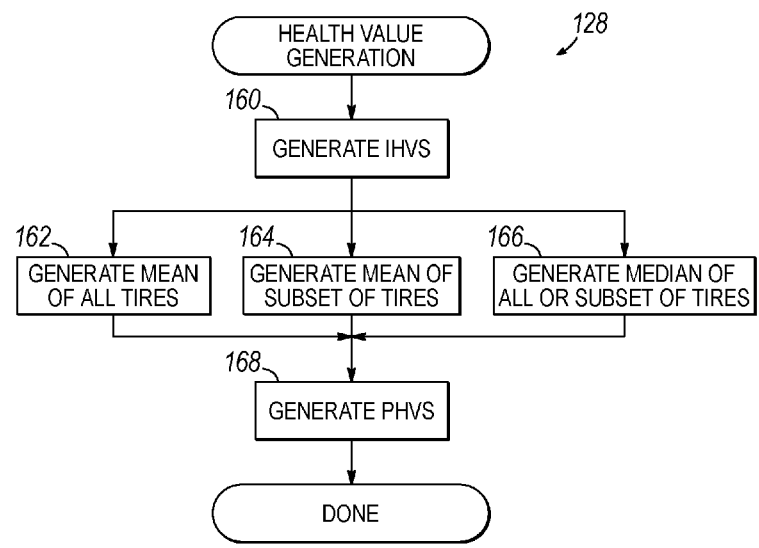
FIG. 8 is a flowchart illustrating an exemplary sequence of steps performed by the health value generation step referenced in FIG. 4.

In the illustrated embodiment, health assessment incorporates both individual tire self-comparison and peer-based comparison. As shown in FIG. 8, for example, health value generation step 128 of FIG. 4 may include a block 160 for generating an individual health value (IHV) for each tire on a vehicle using an individual tire self-comparison. Next, a peer-based comparison is performed in blocks 162-168. Depending upon the algorithm used, a mean or median of all or a subset of tires is calculated using one of blocks 162, 164 and 166. Then, in block 168, a peer-based health value (PHV) is generated for each tire on the vehicle from the mean or median calculated in one of blocks 162, 164 or 166, typically by subtracting the calculated mean or median from the IHV calculated for each tire.

As will become more apparent below, the individual tire self-comparison may be used to minimize or eliminate the deviation between different tires on a vehicle while the peer-based comparison may be used to smooth fluctuations within the data from one tire. Furthermore, it will be appreciated that while three blocks 162-166 are illustrated in FIG. 8, in many embodiments, a peer-based comparison algorithm will utilize only one of the blocks when determining a PHV.

Health Assessment—Individual Tire Self-Comparison

With respect to individual tire self-comparison, if tire maintenance is compared with, for example, a traditional machine tool maintenance process, the initial conditions for both processes are similar, i.e., a tire is properly inflated and a tool is newly changed. However, for a machine tool, it starts degrading from the first day it is used, while a tire will still be considered to be in a good health condition as long as it maintains a same pressure level. The tire health condition starts to degrade only after a tire begins to leak. When a tire's pressure reaches a certain level, which is analogous to a machine tool reaching a certain level indicative of excessive wear, component maintenance should be triggered. For a tire, a leakage may be fixed while for machine tools, the tool would need to be replaced.

However, a significant dissimilarity exists between tire maintenance and machine tool maintenance. For tools that are newly installed, all typically have same health conditions, since all tools are expected to follow the same specification, whereas after maintenance tires are typically inflated to similar but not necessarily the same pressure levels. Though tires may be inflated to different levels, they all still may be considered to be in the same "good" health condition, i.e. they are not leaking. As such, in the illustrated embodiment, discrepancies in inflation levels among different tire instances on a vehicle are desirably compensated for to ensure that all tires are subjected to the same healthy initial condition after maintenance. Otherwise, such discrepancies may mask the real health conditions of the tires and prevent a degrading condition from being early detected.

As such, in the illustrated embodiment, individual tire self-comparison is utilized to compare the current performance of a specific tire with its "normal" performance, i.e., the conditions under which the tire's model is trained, to reduce or eliminate discrepancies between individual tires. In one embodiment, for example, distance-based assessment (DBA) may be used to centralize the compensated pressure from all tires on a vehicle to the same level.

Using a DBA model, the first several data samples from each tire are used to "train" the model baseline for each tire. The center of the data, which is the mean value of data samples from each tire, is calculated to cancel out any data acquisition errors from the TPMS system and establish the normal behavior baseline. Subsequent data samples are then compared against this mean value to generate a "distance" or difference between the data sample and the mean value. This distance, which is referred to herein as an individual health value (IHV), is then used to determine variations in individual tires. In one embodiment, for example, a mean pressure value for each tire may be determined during training, and an IHV may be calculated for each tire based upon the difference between the compensated pressure and the mean value.

Figure 9A:
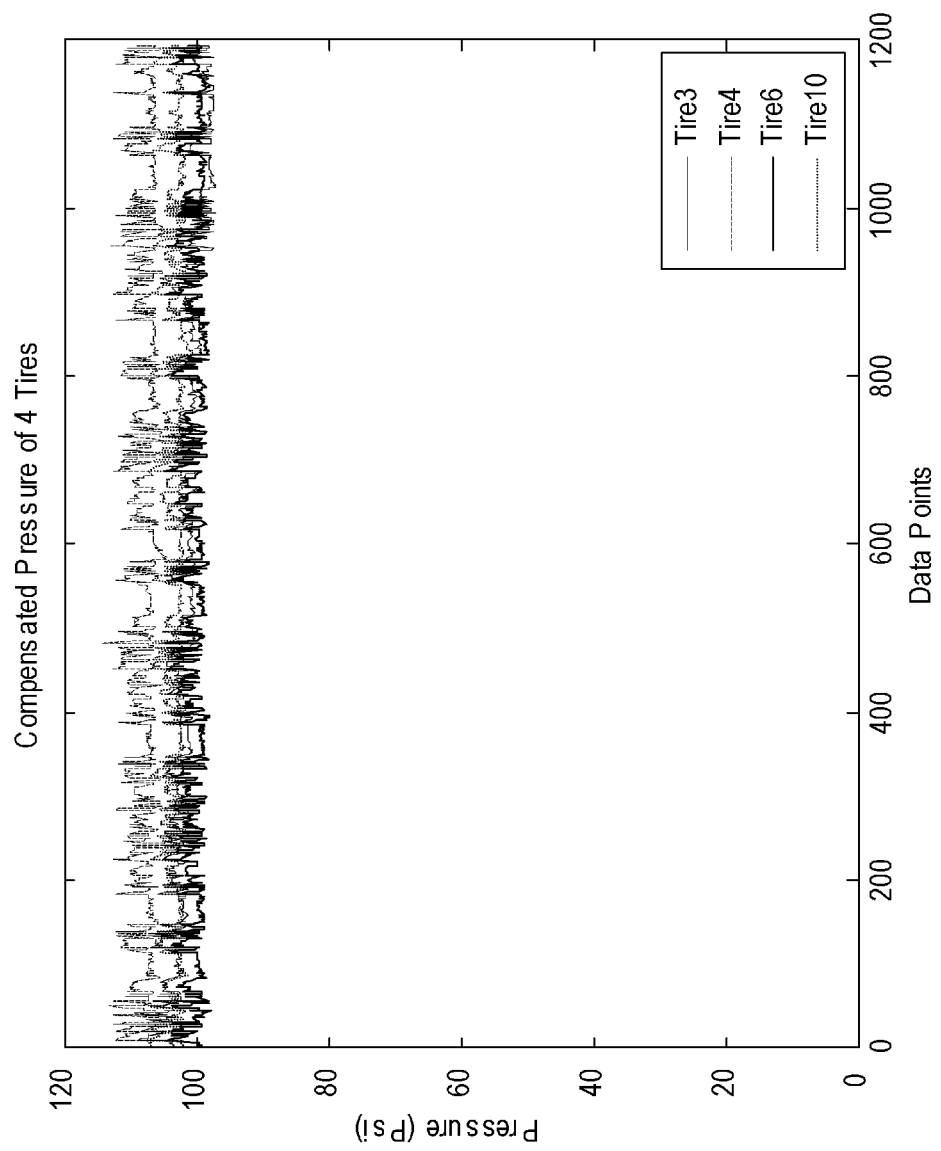
FIGS. 9A and 9B are graphs comparing compensated pressure and individual health values for an example data set.
Figure 9B:
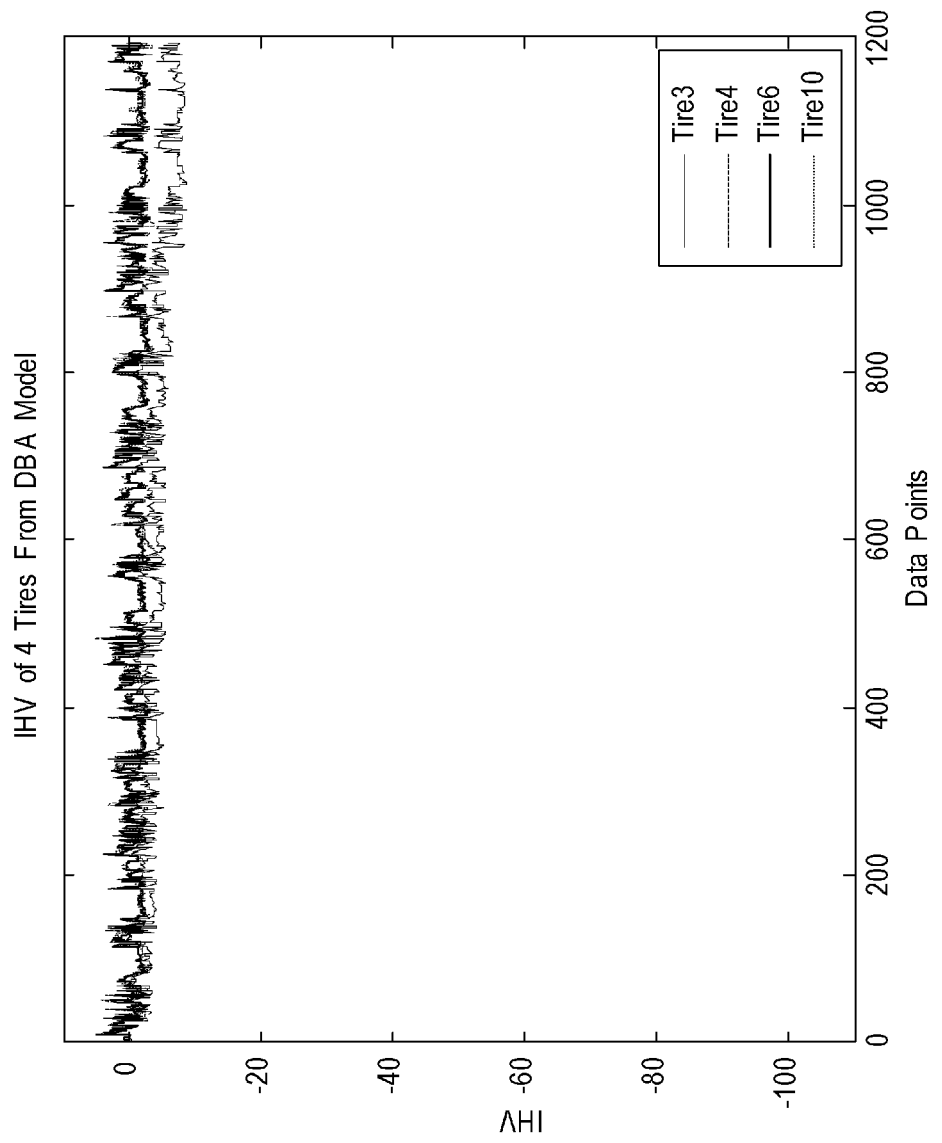

FIGS. 9A-9B, for example, illustrates the performance of DBA on an exemplary set of data points for four tires on a vehicle. The graph in FIG. 9A illustrates the calculated compensated pressures of four tires, while the graph in FIG. 9B illustrates the IHV of those same four tires as generated from the DBA model. In this example, the Fisher's Criterion value for the IHV is 0.1374, which is substantially higher than the corresponding value of 0.007 for the compensated pressure only. Fisher's Criterion is an informatics test that evaluates the separability of multiple variables when there are more than two classes in a dataset. For a two-class dataset, the Fisher's Criterion is given by:

$$J = \frac{|m_1 - m_2|^2}{s_1^2 + s_1^2}$$

where $m_1$ and $m_2$ are respectively means of two classes, while $s_1$ and $s_2$ are standard deviation of two groups. The numerator represents the squared distance between two groups while the denominator represents the variance summation within each group. Therefore, a greater Fisher's Criterion value indicates a higher separability.

It will be appreciated that other models and individual self-comparison techniques may be used in other embodiments of the invention. For example, two alternative self-comparison techniques that may be used include logistic regression and self-organizing maps. As with DBA, in order to start testing as early as possible to detect possible leakages, a basic training of at least a minimum of two samples may be desired, after which model parameters will continue to be updated as more data samples are received. In some embodiments, testing and training may be performed in parallel, and every time after a new data package is received, the models may be updated until enough data samples have been collected to adequately train the models, at which point training may be discontinued while testing continues. The number of training samples may be picked, for example, by leveraging the size of the training data and the testing performance so that data samples in the training step may cover a normal performance range that is wide enough from all tires to form a general health baseline. One model is typically built from each tire, i.e. for a truck with 18 tires, 18 models may be built.

Logistic regression (LR), sometimes also known as logistic model or logit model, is a binominal regression, which is usually used to predict the probability of the occurrence of a discrete event by mapping the multi-dimensional data to a value between 0 and 1. The data used by the model can be both numerical and categorical, such as sex, presence, year and etc. For the purpose of tire health monitoring, it may be used to quantitatively evaluate current system health conditions as a supervised method.

LR is based on the logistic function:

$$p(z) = \frac{e^z}{e^z + 1} = \frac{1}{1 + e^{-z}}$$

where z is defined as:

$$z = \beta_0 + \beta_1 x_1 + \beta_2 x_2 + \beta_3 x_3 + \ldots + \beta_n x_n$$

and where $\beta_0$ is the intercept, $\beta_1, \beta_2, \ldots$ are regression coefficients while $x_1, x_2, \ldots$ are independent variables.

From these equations, a significant advantage of LR may be seen that while a linear combination of all independent variables may be any value from negative infinity to positive infinity, the output is a value bounded between 0 and 1.

By rewriting the aforementioned equations, the following relationship is then observed:

$$z = \log\frac{p(z)}{1-p(z)} = \beta_0 + \beta_1 x_1 + \beta_2 x_2 + \beta_3 x_3 + \ldots + \beta_n x_n$$

In practice, LR is typically used as a supervised statistical model, which means during the training step, data from both acceptable and unacceptable conditions is required. A group of sample inputs $\{x_1, x_2, \ldots\}$ may be observed from both system conditions, and the corresponding probabilities $\{p(z)\}$ may be specified according to model needs (e.g., 0.95 may be used for acceptable conditions and 0.05 for unacceptable conditions). Then, the model parameters $\beta_0, \beta_1, \beta_2, \ldots$ may be obtained by Maximum likelihood estimation (MLE), which explores the best parameter combination that maximize the probability of observed data by an iterative loop.

After the model parameters are all trained, the test data may be fit into the model to calculate the current system individual health values (IHV). To meet the training requirements of the LR model, LR models may be trained by both data from acceptable and unacceptable conditions. For tire inflation, 0 psi is the lowest pressure value that a tire could achieve, and could be taken as the data from bad condition. Thus, some compensated pressure samples may be used to represent an acceptable condition while some other 0 psi values may be used for an unacceptable condition. Two corresponding HV's, 0.95 and 0.05, may be given respectively to each health condition. After training, all the output IHV's from LR will be bounded to values between 0 and 1.

Self Organizing Map (SOM) is a type of neural network model that is typically considered as an unsupervised learning model because it is trained only by the topological structure of the data, and no data classification information is necessary. SOM preserves the topological structure of data by introducing a neighborhood function and it is typically a good data visualization tool since it usually reduces the data dimensionality down to a small number, usually two.

SOM consists of nodes of neurons, each of which is correlated with a weight vector. In the beginning all the nodes are randomly arranged on the map, then in an iterative training step, they are updated based on learning rules, such as:

When a sample vector is given as an input to the map, the distance between this sample vector and all the nodes will be calculated, and the node with the shortest distance will be selected and taken as the Best Matching Unit (BMU).

BMU's neighbor nodes, which are pre-determined by the topological shapes, are all updated according to the new sample vector, and the learning rate is respective to the distance between BMU and the sample vector, which is monotonically decreasing.

In the end of learning step, the nodes are clustered into groups, and each group represents one class of data type.

Self Organizing Map-Mean Quantization Error (SOM-MQE) is an extended SOM model that may also be used for health assessment. Since with tire health assessment it is relatively easy to gather data during a healthy condition, while in contrast failure data is typically more precious and hard to collect, as a semi-supervised learning method SOM-MQE has advantages in terms of model training convenience. It trains the model only based on healthy data and calculates the distance between the testing samples and the trained baseline during testing to evaluate how far the testing data is from the baseline. The further the testing sample is from the baseline, the worse health is indicated for the current system.

The map is firstly trained with normal operation data, and then the MQE, which is defined as the distance between the testing sample and its BMU, is calculated. Since the BMU identification process is a searching process that targets to find a trained node that has the minimal Euclidean distance to the testing sample, even a sample that belongs to a space not covered by the training data can find a BMU and calculate its MQE, which is taken to be the health indicator of the SOM-MQE model.

Similar to LR model, the SOM-MQE model may be trained by the first samples, which are assumed to be collected from acceptable condition. The regular output from the SOM-MQE model is MQE distance, which is a positive number. However, in order to make the result more intuitive, it may be desirable to negate all MQE distances to better represent leakages.

Additional models and methodologies may also be used to generate NV's, e.g., statistical pattern recognition, Gaussian mixture models, neural networks, etc. Therefore, the invention is not limited to the particular models and methodologies disclosed herein.

Health Assessment—Peer-Based Comparison

While the aforementioned processing steps have been found in many embodiments to minimize or reduce many of the variations between tires on a vehicle, it is desirable in many embodiments to further utilize a peer-based comparison to address the fluctuations that may occur within each tire.

Again with comparative reference to machine tool maintenance, for traditional machine tool monitoring, features which are used to both better represent the original dataset and reduce the dataset size are typically extracted based on runs (a duration that a machine tool finishes all its repeatable moves). Because the machine tool repeats a same series of movements again and again, assuming it only has one regime, the features should remain constant if the machine tool is kept in a good condition. On the other hand, tires do not have a fixed operation plan, e.g., a vehicle may be driven on different routes every day. In addition, even when a vehicle operates on the same route every day, environmental conditions such as ambient temperature changes from time to time. Therefore, it is much harder to define a fixed operation cycle for use as an analysis basis. Put another way, tire operation has been found to be a dynamic process that is greatly affected by environmental uncertainties.

Figure 10:
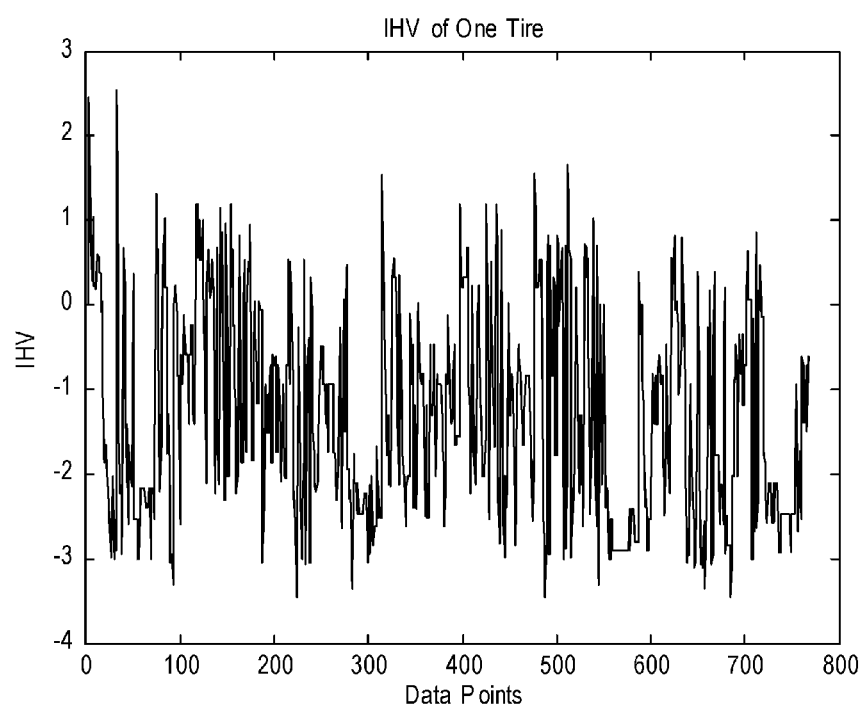
FIG. 10 is a graph of individual health values for a tire in an example data set.

As a result of these environmental uncertainties, even after temperature compensation, a theoretical flat line of compensated pressure that would be expected to be seen in a tire with no leakage is not seen in practice. Instead, a flat trend with many fluctuations is typically observed. The fluctuations may be caused by many aspects, such as variances of ambient temperature, tire load, speed, road surface roughness, ambient atmospheric pressure, etc. In addition, through individual tire self-comparison, the fluctuation effect is passed down from the compensated pressure to the IHV, e.g., as shown in FIG. 10.

From a system monitoring standpoint, the fluctuations reduce the accuracy of both fault detection and prediction. For example, for fault detection, since the trend may have a relatively large variation, the threshold setting faces a big tradeoff between sensitivity and false alarm.

It is known that the valleys in IHV data are generally formed when a vehicle is parked when the tire temperatures are low while the high peaks are mostly caused by temperature build-ups. It also can be observed that even after temperature compensation, the compensated pressure still has some degree of temperature impact, e.g., due to ambient temperature. While ambient temperature could form the basis for additional modeling and/or compensation, in many embodiments it is desirable to avoid monitoring ambient temperature, given that ambient temperature is typically not provided by many conventional TPMS systems.

While ambient temperature may be used in some embodiments, in the illustrated embodiment a data-driven peer-based comparison is utilized to reduce the effects of fluctuations due to ambient temperature and other environmental effects.

Peer-based comparison in the illustrated embodiment relies on the aforementioned assumption that all the tires on a given vehicle share a similar operating condition including environment conditions, road conditions and normal tire slow leakages. Since all tires from one vehicle share a similar general performance, in some embodiments a mean value of IHV's from all tires may be calculated such that differences between the individual tires and the mean may be indicative of leakage conditions, as illustrated by block 162 of FIG. 8.

Figure 11:
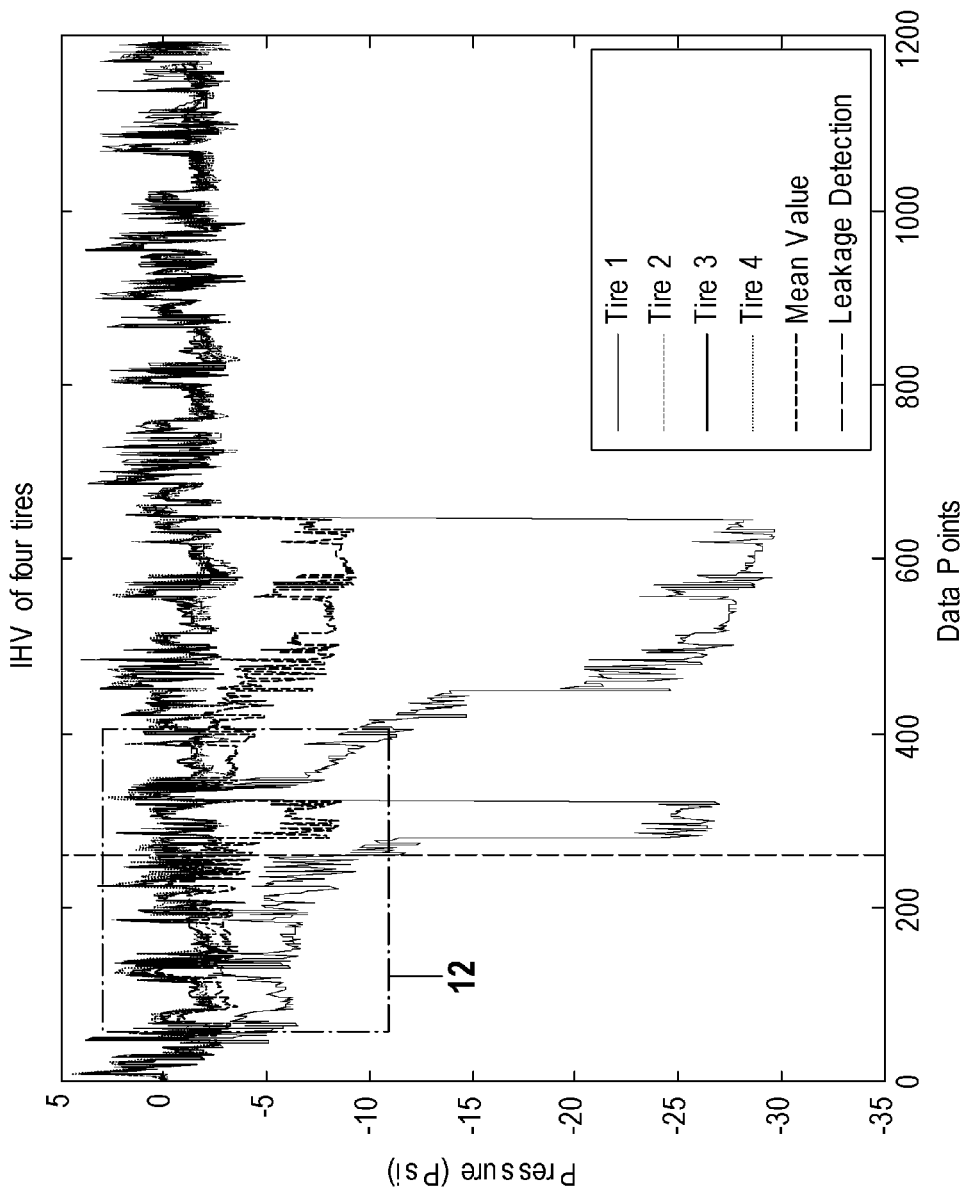
FIG. 11 is a graph of individual health values for four tires in an example data set, illustrating the influence of a leaking tire on a mean value.

It has been found, however, that while the mean of all tires may be sufficient when all tires are in healthy conditions, when leaking tires are involved, especially when the leak is severe, the mean value may be biased to that leaking tire's condition and may not be sufficiently indicative of a general healthy tire condition. FIG. 11, for example, illustrates an example data set for a vehicle where the mean value of the first half of data (before data point 648) is heavily biased to tire 1, which has a leak. On the other hand, tire 1 is fixed at point 648 and the IHV's from four tires are centralized back to the same level and more closely track the mean value.

Figure 12:
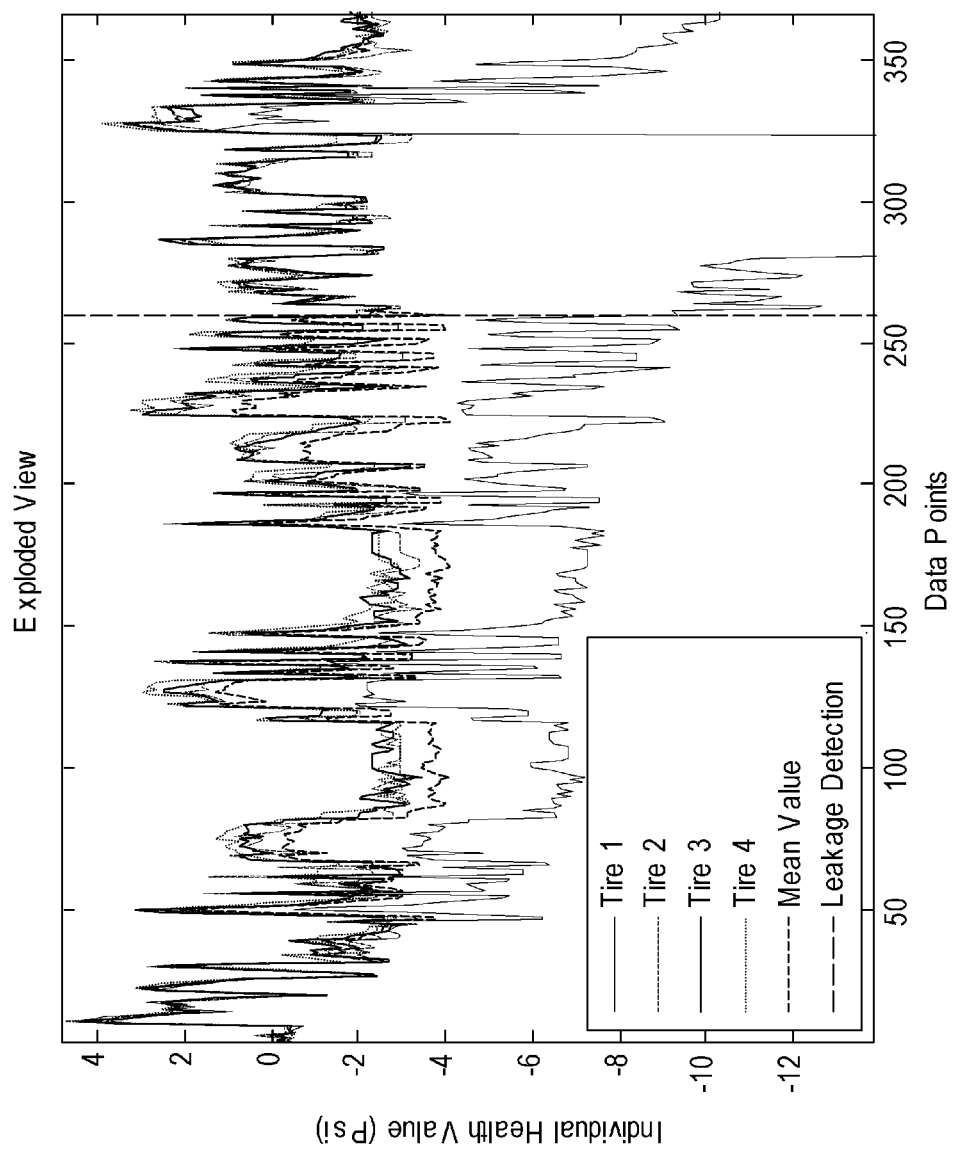
FIG. 12 is an exploded view of a graph of individual health values for four tires in an example data set.

In other embodiments, an additional rule may be integrated to address the potential bias of a leaking tire by attempting to calculate the mean value of tires determined to not have a leak. Thus, if during operation any tire is detected with a potential leakage, the tire may be labeled such that when the mean value is calculated, the data from this leaking tire is not included, and the mean is only based on a subset of tires, as illustrated in block 164 of FIG. 8. It has been found that application of the rule at least partially addresses the bias attributable to the leaking tire. It has also been found, however, that the bias issue may still be present in some instances because at the onset of a leak, while the pressure drop may be small initially, the pressure drop may have an impact on the mean value. For instance, in the same case illustrated in FIG. 11, a mean value could be calculated based on all four tires until the leakage was detected in data point 260. As shown in FIG. 12, for example, it may be observed that the mean value represents the general performance of all good tires well after the detection of leakage. However, before the detection, tire 1 already had the leak, and a small bias of the mean value may be better viewed from the exploded plot.

Therefore, in still other embodiments, it may also be desirable to integrate an additional rule to further address the potential bias of a leaking tire. In particular, another assumption that may be made, as noted above, is that during regular operation, more than half of the tires from a vehicle are in good condition. Put another way, at least six out of ten tires on a tractor may be assumed to not be leaking at any given time, and such, an assumption may be made that more than half of the tires that do not have a detectable leakage from a vehicle are in good condition. For example, a tractor has ten tires, and two of them have detectable leakage. So the additional rule assumes that at least five out of eight tires that are without detectable leakage are in good condition.

Figure 13:
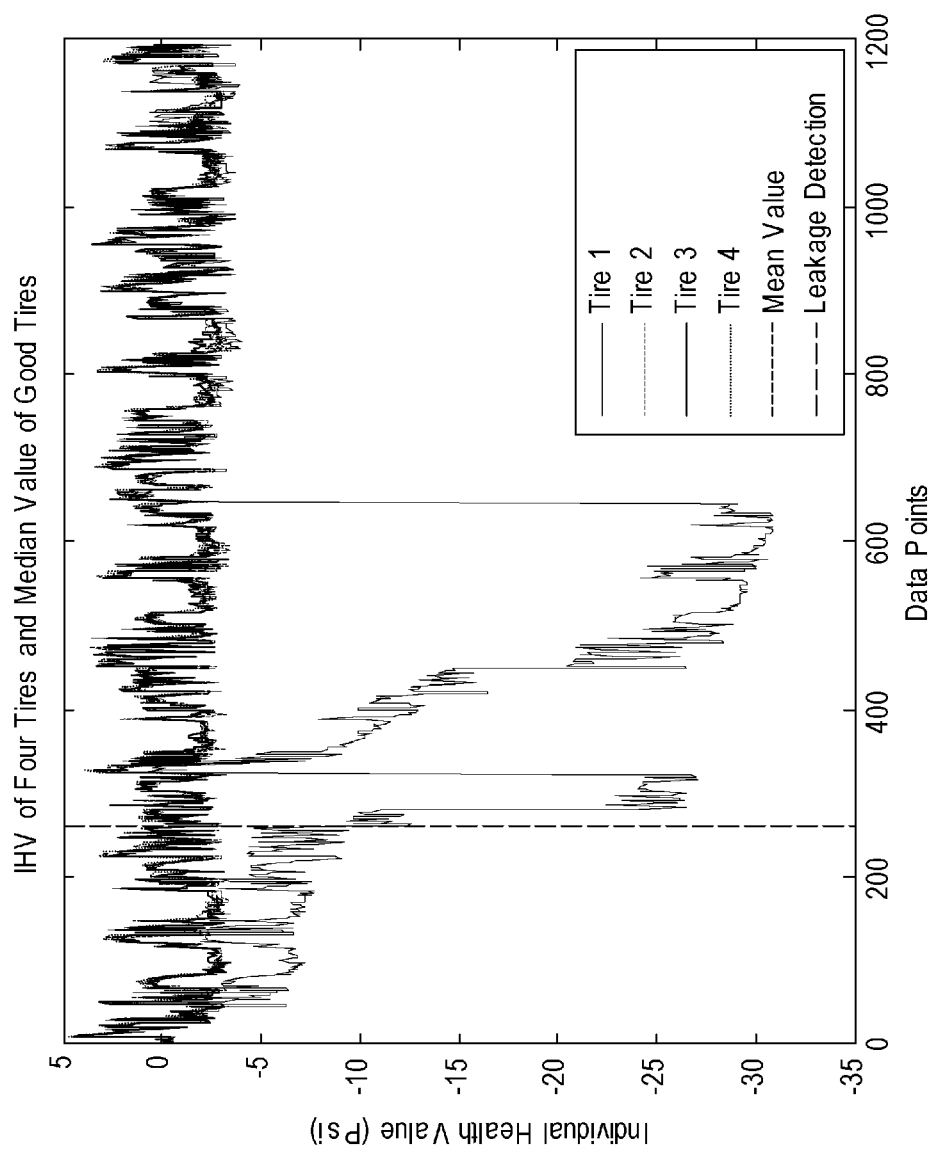
FIG. 13 is a graph of individual health values for four tires in an example data set, and including a graph of a median value.

If the statement is well accepted, a median value of all or a subset of the tires on the vehicle may be used to serve as an indication of the general tire healthy tire performance, as illustrated by block 166 of FIG. 8. In addition, a median value calculation may only require as few as one or two values that are in the very middle of all values, which refers to the value from good tires according to the aforementioned assumption of more than half of the tires from a vehicle being in good condition. FIG. 13, for example, illustrates IHV's of four tires and a median value calculated therefrom to represent the general healthy tire performance of all good tires under a dynamic operating condition and even with some leaking tires. Of note, while in some embodiments it may be desirable to exclude known or predicted leaking tires from the median calculation, in many embodiments, inclusion of these leaking tires in the median calculation will not appreciably alter the resulting median, so it may not be desirable to attempt to exclude leaking tires from the calculation.

Figure 14A:
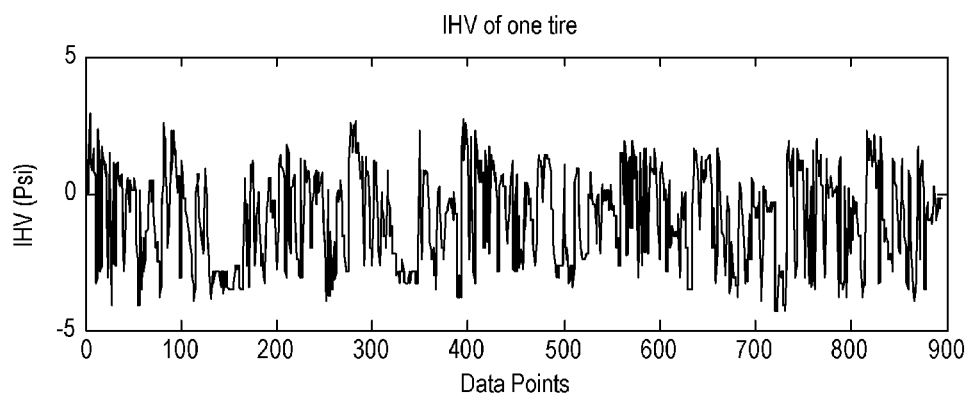
FIGS. 14A and 14B are respective graphs of individual and peer-based health values for a tire in an example data set.
Figure 14B:
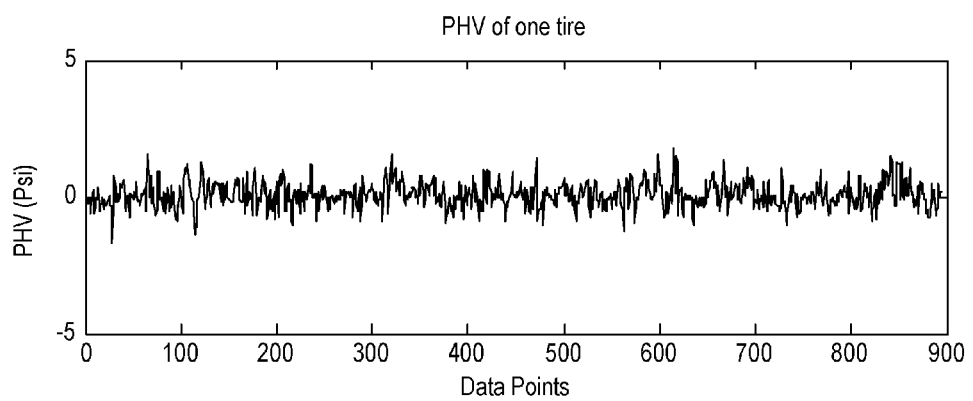

Thus, in some embodiments, the general healthy tire performance based on the median calculated from a subset of tires may be subtracted from all individual tire performances, i.e. IHV's, to reduce the fluctuation caused by dynamic operating conditions. This value obtained after performing peer-based comparison is referred to herein as Peer-based Health Value (PHV), and as illustrated by FIGS. 14A-14B, it may be observed that the PHV value calculated in the manner described herein (FIG. 14B) has a comparatively smaller variance than the corresponding IHV value for the same tire (FIG. 14A), and also that environmental factors including temperature effects have a substantially smaller impact on the data.

It will be appreciated that the determination of a mean or median using a subset of tires from a vehicle may be implemented in various manners consistent with the invention, and may include various numbers and combinations of tires from a vehicle. For example, a mean or median may be taken from each axle, from each tire type (e.g., steer/drive/trailer), or from steer, inner drive, outer drive, inner trailer and/or outer trailer tires. Alternatively, a mean or median may be taken from the maximum and minimum, or the second maximum and second minimum from any of the aforementioned tire combinations. The invention, however, is not limited to the particular determinations disclosed herein.

Anomaly Detection and Diagnosis

Again returning to FIG. 4, and specifically to anomaly detection and diagnosis step 110, the PHV calculated for each tire in a vehicle is analyzed to detect faults and perform diagnosis in response to detected faults.

It may be assumed that all tires have normal leakages, and are inflated regularly to keep their pressures in the normal range. In addition, there are two possible outcomes may be found from the data after each inflation: 1. the pressure differences between tires remained the same; 2. the pressure differences between tires changed. In most cases, the pressure differences change after inflations. Meanwhile, the tire health assessment models for the vehicle discussed above are all based on these pressure differences, and as such, after tire inflations, the tire health assessment models typically need to be retrained to determine the new pressure differences between tires. While in some embodiments, a manual triggering of model retraining may be supported, in other embodiments, it may not be possible or desirable to support manual retraining, and as such, it is often desirable to provide a data driven anomaly detection algorithm to automatically identify tire inflations and thereby trigger retraining of the tire health assessment models.

Anomaly detection desirably provides a satisfactory accuracy providing a relatively low incidence of false alarms while retaining relatively good sensitivity. In addition, anomalies desirably should be detected in a relatively short time after they occur, since timeliness is typically highly valued by real time systems.

To address these often-competing concerns, different features may be extracted from the processed and/or raw data, including, for example: mean, median, difference, standard deviation, max, min, etc., both within a single tire and among tires. "Within a single tire" means that features are extracted from one tire over a certain period of time (or alternatively, using a moving window technique). "Among tires," on the other hand, means features are extracted from data collected from various tires at the same time stamp. It has been found that though many tested features are able to indicate inflation events, many require a relatively long lag after inflations occur to collect enough data to extract suitable features.

In some embodiments, two different types of features may be used: a first, referred to herein as an anomaly detection feature, may be used to locate abnormal points; and a second, referred to herein as an anomaly diagnosis feature, may be used to diagnose what causes an abnormal point.

Figure 15A:
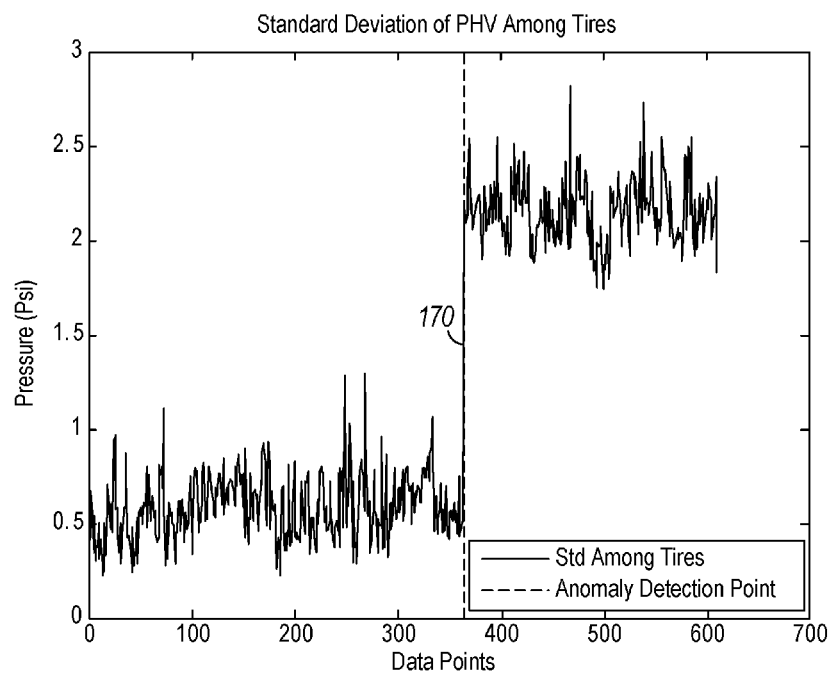
FIGS. 15A and 15B are respective graphs of two different anomaly detection features for an example data set.
Figure 15B:
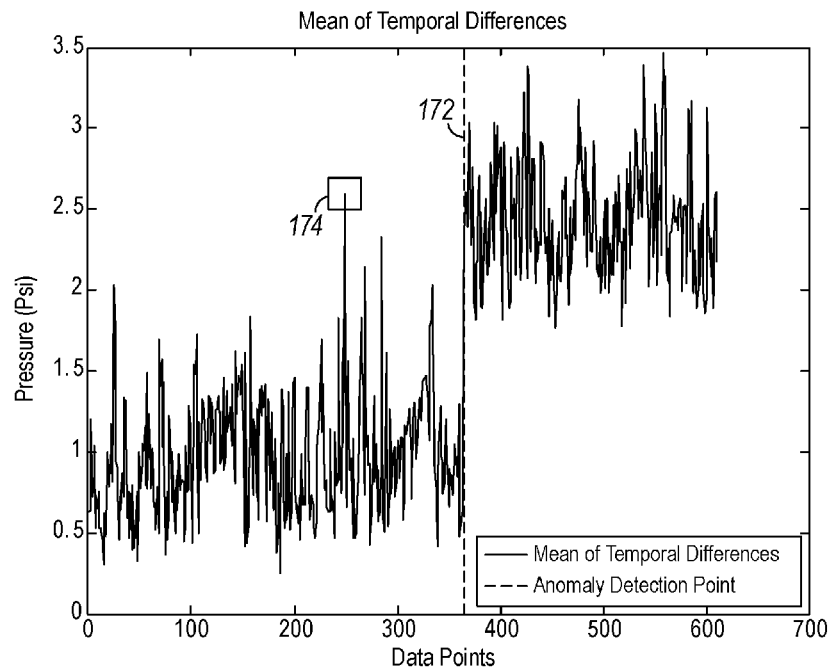

FIGS. 15A and 15B, for example, illustrate two candidate features that may be used as an anomaly detection feature, standard deviation of PHV among healthy tires (FIG. 15A), and the mean of temporal differences (FIG. 15B). As an example, to calculate the mean of temporal differences, the difference between two consecutive measurements from the same tire position for all tires may be calculated, and the mean of all the differences from healthy tires may be calculated. Thus, for example, if there were 10 healthy tires, the readings from the first data package were [100, 100, . . . 100, 105], and the readings from the second data package were [100, 100, . . . 100, 100], then the temporal difference would be [0, 0, . . . 0, −5], leading to a mean of −0.5.).

From both figures, two clusters are illustrated, with the initial cluster shifting up to form a new cluster when the anomaly happens (illustrated by lines 170, 172). The anomaly detection feature is used to detect system level, i.e. vehicle level anomalies, and as such, information from all of the tires on the vehicle is taken into account for each feature. It will be appreciated that FIGS. 15A-15B provide a view of the respective features over a long time; however, in a real time system, the feature values are calculated one by one, and as such, when an anomaly occurs, only one point would be observed in the second cluster. As such, in a real time system, it may be desirable to provide a lag of one or more extra data packages to ensure the shift of a cluster is not caused by a single peak as an outlier, as would be the case with the data value represented at 174 in FIG. 15B.

Figure 16A:
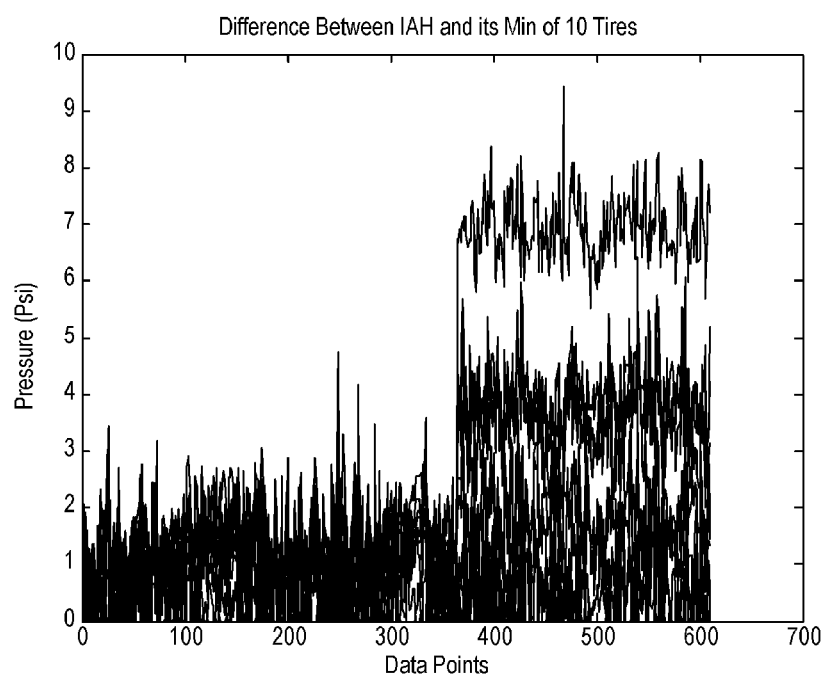
FIGS. 16A and 16B are respective graphs of two different anomaly diagnosis features for an example data set.
Figure 16B:
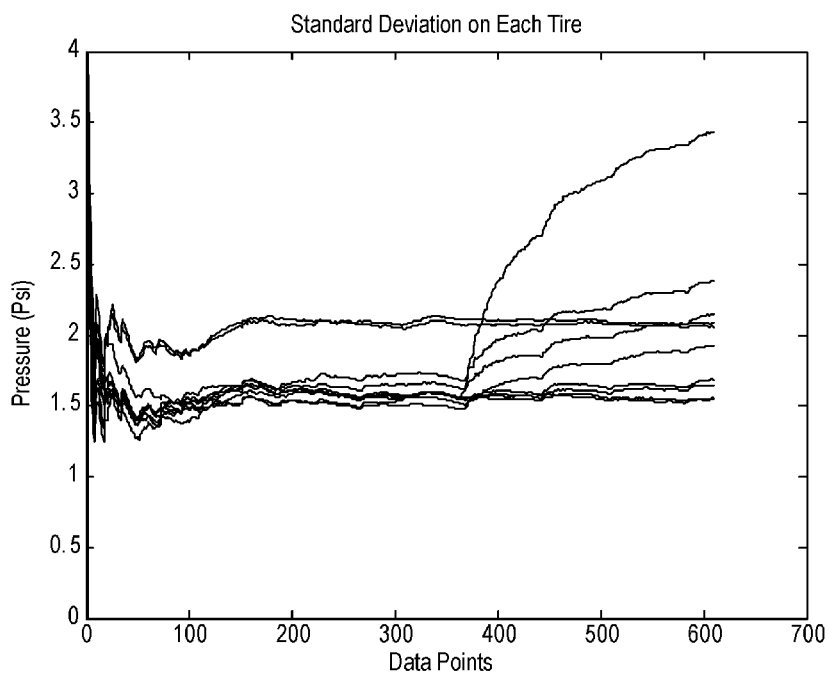

After the anomaly point is detected, it is desirable to provide a diagnosis process to attempt to understand the reason behind the anomaly point. Such a diagnosis process utilizes one or more anomaly diagnosis features, which in contrast to an anomaly detection feature, are intended for use in understanding individual tire performances when an anomaly is detected, and such features may accordingly be taken from individual tires. For example, FIGS. 16A-16B respective illustrate the use of two different features, difference between IHV and its minimum (FIG. 16A) and standard deviation (FIG. 16B) for each of ten tires.

Figure 17:
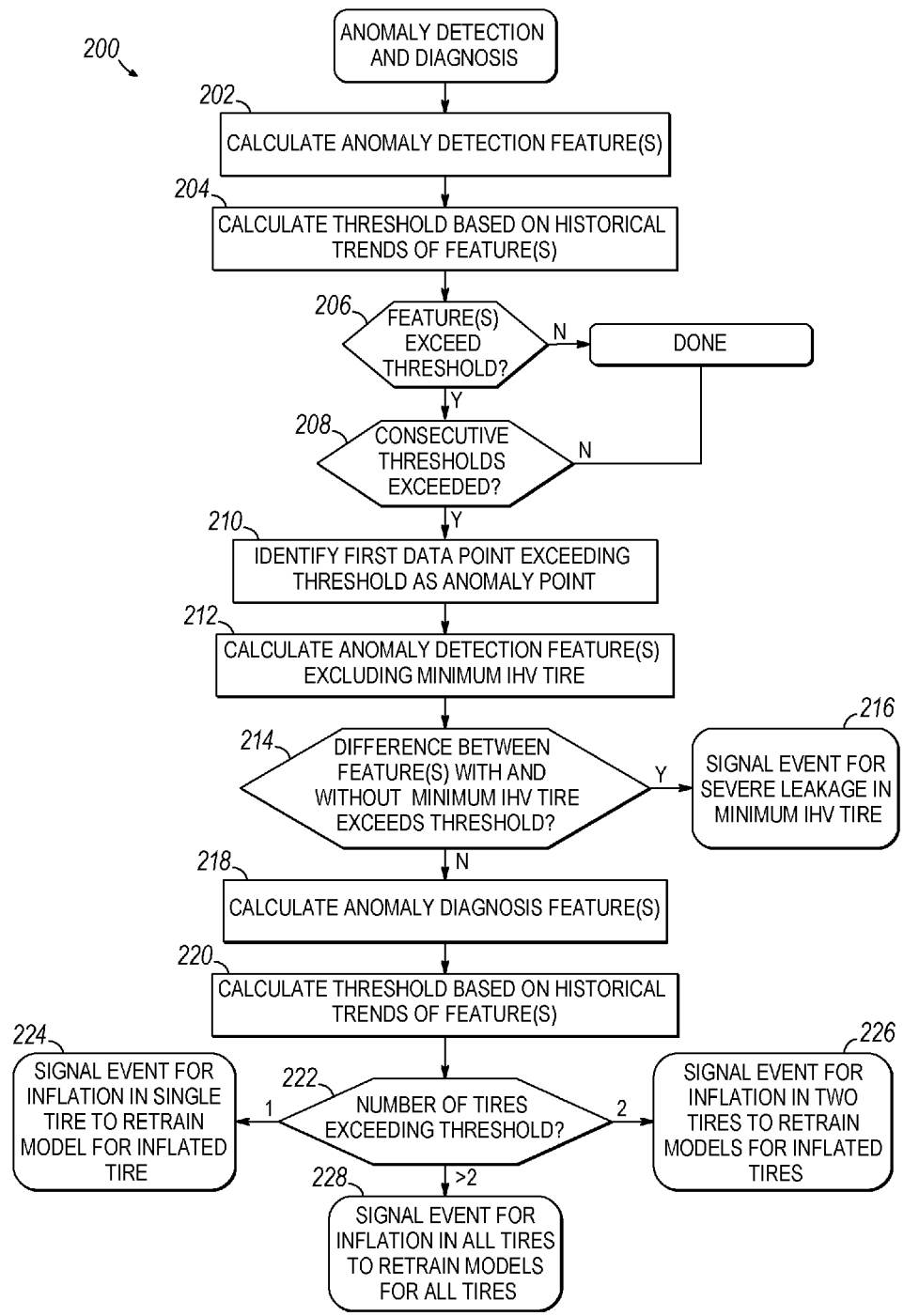
FIG. 17 is a flowchart illustrating an exemplary sequence of steps performed by an anomaly detection and diagnosis process capable of being performed by the tire health monitoring system of FIG. 1.

FIG. 17 illustrates an exemplary anomaly detection and diagnosis process 200 consistent with the invention. Process 200 may executed for each new set of data points, after IHV and PHV values have been calculated for each tire. Process 200 begins in block 202 by calculating one or more anomaly detection features, which may be based, for example, on the IHVs from tires in good condition. Anomaly detection features may include, for example, standard deviation of PHV, IHV, or compensated pressure, mean of temporal differences, etc.

Next, in block 204, a dynamic or moving threshold may be calculated based on the historical trends of the features in question. In one embodiment, for example, a 5-sigma distance from a mean may be taken as a threshold to decide if a point is an anomaly. In alternative embodiments, a fixed threshold may be used.

Next, blocks 206 and 208 respective determine if the features exceed the calculated thresholds, and if so, whether the thresholds have been exceeded for a predetermined number of consecutive sample periods. In one embodiment, for example, if two consecutive anomaly detection feature values exceed moving thresholds, an anomaly may be detected. In other embodiments, only a single threshold may need to be exceeded to detect an anomaly, while in still other embodiments, more than two thresholds may need to be exceeded.

If the condition in either block 206 or block 208 is not met, no anomaly has been detected, and process 200 is complete. Otherwise, control passes to block 210 to identify the first point that is out of the threshold as the anomaly point.

Block 212 next initiates anomaly diagnosis to attempt to determine whether an anomaly is due to a leakage event or an inflation event. In the illustrated embodiment, four possible events may be indicated: (1) a severe leakage occurs in a tire; (2) a single tire has been inflated; (3) two tires have been inflated; and (4) more than two tires have been inflated.

Block 212 in particular re-calculates one or more anomaly detection features, but excluding the tire having the minimum IHV from the calculation. For example, if among ten tires, tires 1 to 9 are considered good, and at the time when the anomaly occurs, tire 1 has the minimum IHV among tires 1 to 9, then the anomaly detection features will be re-calculated based on tires 2 to 9. By doing so, if the anomaly is caused by a severe leakage, the leaking tire will then have the lowest IHV, thus the anomaly detection features with and without the lowest IHV may be compared in block 214, so that any nontrivial difference (i.e., a difference above a threshold) between the results will typically indicate that the tire with the minimum IHV has caused the anomaly point, and as such, has a severe leakage, while little difference indicates that the cause of the anomaly point is not a severe leakage.

Therefore, in the case of a severe leakage, control passes to block 216 to signal an event indicating severe leakage of the minimum IHV tire. Otherwise, control passes to block 218 to calculate one or more anomaly diagnosis features.

As noted above, one assumption that may be relied upon in the illustrated embodiments is that the chance of two tires starting severe leakage at the same time is very low, so if an anomaly is not led by single tire severe leakage, it may be considered to be caused by inflation of one or more tires. As such, when an anomaly is detected but a severe leakage is not indicated, a check may be conducted on all good tires for potential inflation, tire replacements or rotations. In addition, since model retraining will reset tire health values, and return these values to around a value of 0, a slow tire leakage trend may, in some instances, be disguised as a result of retraining. Therefore, to prevent potentially unnecessary model retraining, it may be desirable in some embodiments to detect inflation of only a subset of tires so that only those tires determined as having been inflated will be retrained. In the illustrated embodiment, for example, "one tire inflation" and "two tires inflation" events may be detected along with a "more than two tires are inflated" event, so that only one, two or all tire models will be retrained as necessary. It will be appreciated that in some embodiments, all tires may be retrained in response to any tire being inflated, while in other embodiments, three, four, or more tires being inflated may be separately checked.

Anomaly diagnosis features are used in system change detection, e.g., inflation check, tire replacement, tire rotation and/or any other deliberate change of tire pressure, and feature values extracted after the occurrence of an anomaly are tested with thresholds generated by their historical feature values. The number of values that are beyond thresholds may then be used to categorize the root cause of anomaly. Thus, for example, block 218 calculates one or more anomaly diagnosis features such as difference between IHV and its minimum, standard deviation, etc.

Next, in block 220, one or more dynamic or moving thresholds may be calculated based on the historical trends of the features in question. In one embodiment, for example, the mean and standard deviation of the last 100 anomaly diagnosis feature values from each individual tire may be calculated. In one example, two thresholds may be used, with a first threshold being mean plus/minus three times of the standard deviation, and a second threshold being mean/minus plus four times of the standard deviation. In alternative embodiments, fixed thresholds may be used.

Block 222 then determines the number of tires exceeding the threshold(s) and thus determined to have been deliberately changed. In one embodiment the last two anomaly diagnosis feature values from the same tire may be compared with the two thresholds respectively, and if both anomaly diagnosis feature values for a tire are outside of the second threshold, then the tire may be labeled as an inflated/replaced/rotated tire. In addition, the number of anomaly diagnosis feature values that are beyond the first threshold may be accumulated over all tires, and if the total number of beyond-first-threshold-anomaly diagnosis feature values is more than a preset number (e.g., five) all tires may be retrained together.

If it is determined that a single tire was inflated, control passes to block 224 to signal an event indicating that the tire was inflated so that the model for that tire may be retrained. If two tires were determined to be inflated, control passes to block 226 to signal an event indicating that the two tires were inflated so that the models for those tires may be retrained. Otherwise, control passes to block 228 to signal an event indicating that the models for all tires should be retrained.

Slow Leak Check

Again returning to FIG. 4, and specifically the slow leak check in step 134, if the PHV for a tire is normal, then a slow leak will be checked. In one embodiment, a threshold criterion, e.g., a PHV falling below −3 psi, may be defined (e.g., by a user) to decide if a tire has a slow leak. All PHVs from all wheel positions may be compared against the threshold criterion in turn for each iteration, and if a PHV is much lower than the threshold (e.g., more than 1 psi lower than the threshold), two points may be accumulated to a slow leak indicator or count associated with that wheel position. If a PHV is not much lower than the threshold (e.g., less than 1 psi), one point may be added to the slow leak indicator or count, but if a PHV is not lower than the threshold, the accumulated slow leak indicator or count may be reset back to zero and restart accumulating points.

Once the slow leak indicator meets another threshold criterion, e.g., reaching a predetermined value such as 3, the mean value of the last two PHVs from the same wheel position may be calculated and stored as an initial slow leak level. As long as the slow leak indicator is not reset to zero, the same initial slow leak level may be used for this wheel position. A slow leak event may thereafter be triggered in response to another threshold criterion, e.g., where mean values of the last two PHVs are compared with the initial slow leak level from the same wheel position, such that a slow leak event may be triggered and tire health prognostics may be initiated if the mean value of the last two PHVs is lower than the initial slow leak level by a certain amount (e.g., 1.5 psi).

Tire Recovery Check

Again returning to FIG. 4, and specifically the recovery check in step 142, this step checks if any of the detected leaking tires have been fixed based upon the data trend. It is assumed that when a leaking tire is fixed or recovered, the tire will be reinflated, and thereby cause an increase in PHV of the tire. In one embodiment, for every iteration, a leaking tire's delta PHV (the difference between current PHV and last PHV) may be compared with a threshold, e.g., 5 psi. If the current delta PHV is greater than the threshold, a next delta PHV (from the next iteration) may be compared with a second threshold, e.g., 10 psi. If both delta PHVs are greater than the thresholds, the tire may be considered as recovered from leakage (a healthy tire again), causing a tire recovery event to be triggered and retraining to be performed for this tire (block 144).

Tire Health Prognostics

Returning yet again to FIG. 4, an additional aspect of the illustrated embodiments is tire health prediction or prognostics, which is implemented in block 112. Prognostics is used to predict the future health trend of a system based on its historical conditions, and in the illustrated embodiments, historical PHV's from tires with slow leakage are fit into a prediction model to forecast the tires' future performance.

A prediction model consistent with the invention may be implemented using a number of different types of predictive techniques. Four such predictive techniques, designated herein as linear, exponential, cubic spline and piecewise linear, are discussed in greater detail below. Within the context of this discussion, an example data set of 10 tractor/trailer combinations (i.e., 10 18-wheelers), based on TPMS collected every 16 minutes, is used to generate PHV values on 16 minute intervals, with the PHV values in turn used as the input data for the respective models, and with the output of each model being a future leakage trend for roughly 5 hours (20 intervals) to reach a preset low pressure threshold.

Each model may be set up, for example, to be updated recursively starting at the detection of an event until the end of the event has been reached (e.g., when a tire is fixed and reinflated). An initial training set may include the data collected between the last tire inflation event and the leakage detection event. In addition, prediction with a prediction model may cover N steps (e.g., 20 steps) ahead, with a prediction root mean square error (RMSE) calculated for each iteration using the prediction of 20 steps.

Figure 18A:
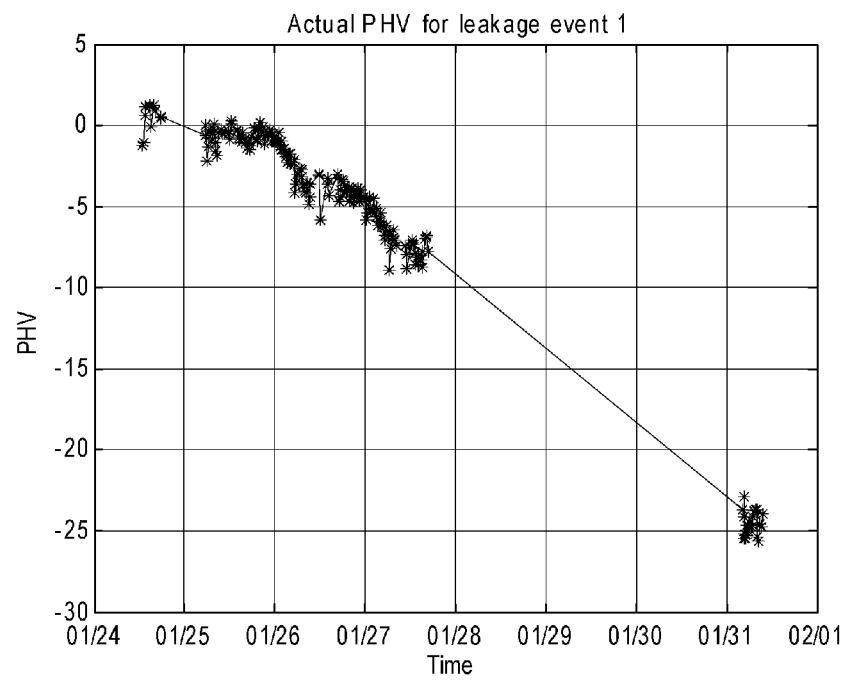
FIGS. 18A and 18B are respective graphs of two example datasets associated with two different leakage events (respectively designated Event 1 and Event 2).
Figure 18B:
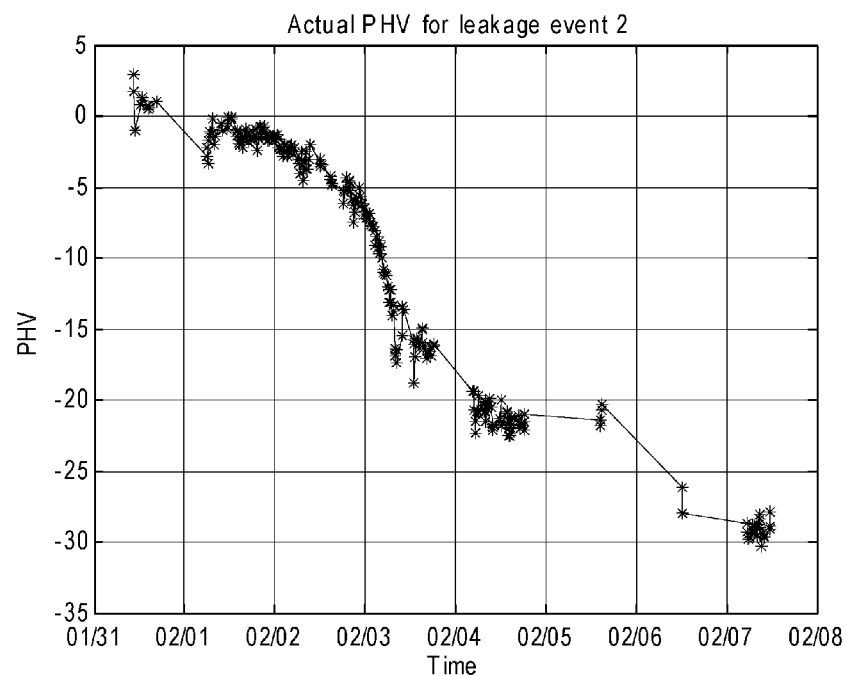

For the purpose of comparing the different techniques, two typical events were used. A first (Event 1), is relatively simpler, and is more linear, while a second (Event 2) has more of a slope change. FIGS. 18A and 18B respectively illustrate PHV values corresponding to these two events.

Figure 19A:
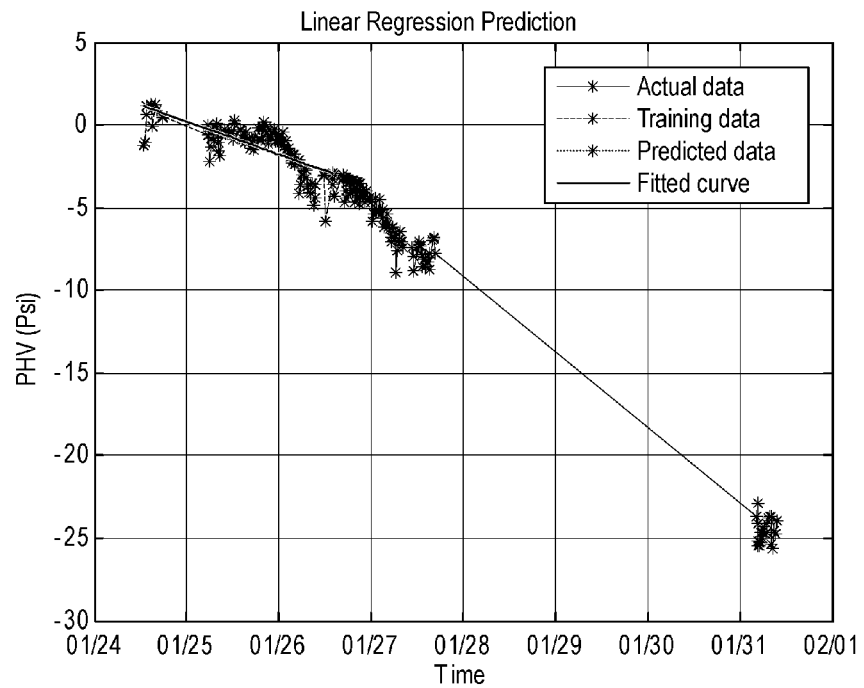
FIGS. 19A and 19B are respective graphs illustrating the application of an example linear prediction model to the example datasets of FIGS. 18A and 18B.
Figure 19B:
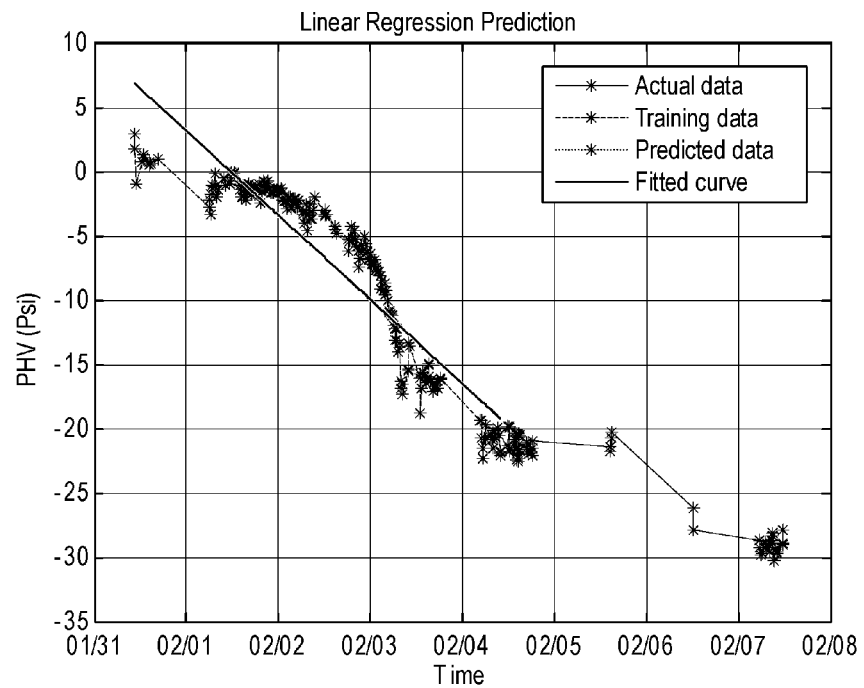

FIGS. 19A and 19B respectively illustrate the application of a linear regression model to the datapoints for Events 1 and 2, respectively. Linear regression prediction has been found to have a relatively low vulnerability to local trends, and may be represented as $f(t)=at+b$, where a is the slope, and b is the intercept, and where the slope is constrained to be less than or equal to zero.

Figure 20A:
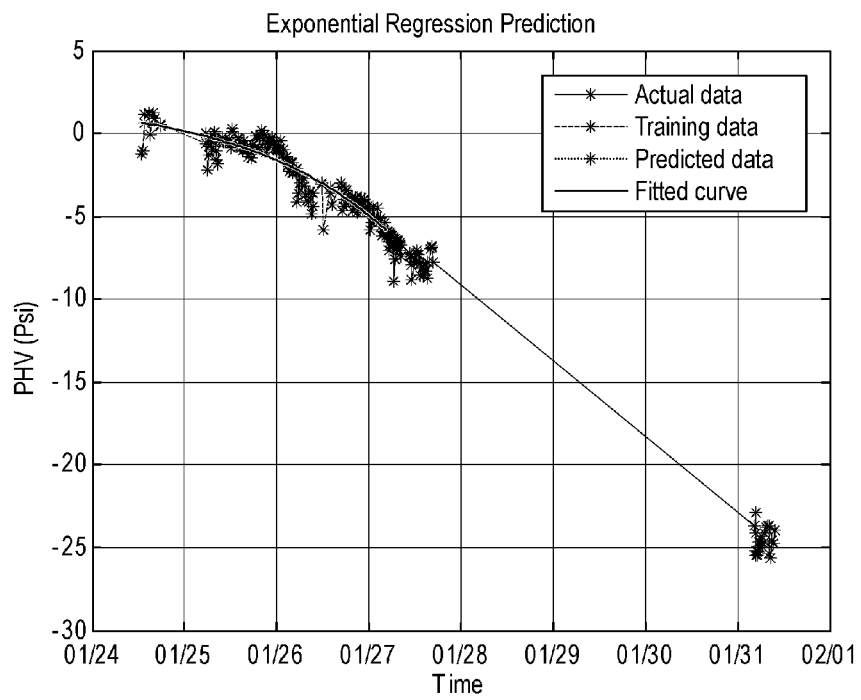
FIGS. 20A and 20B are respective graphs illustrating the application of an example exponential prediction model with exponential extrapolation to the example datasets of FIGS. 18A and 18B.
Figure 20B:
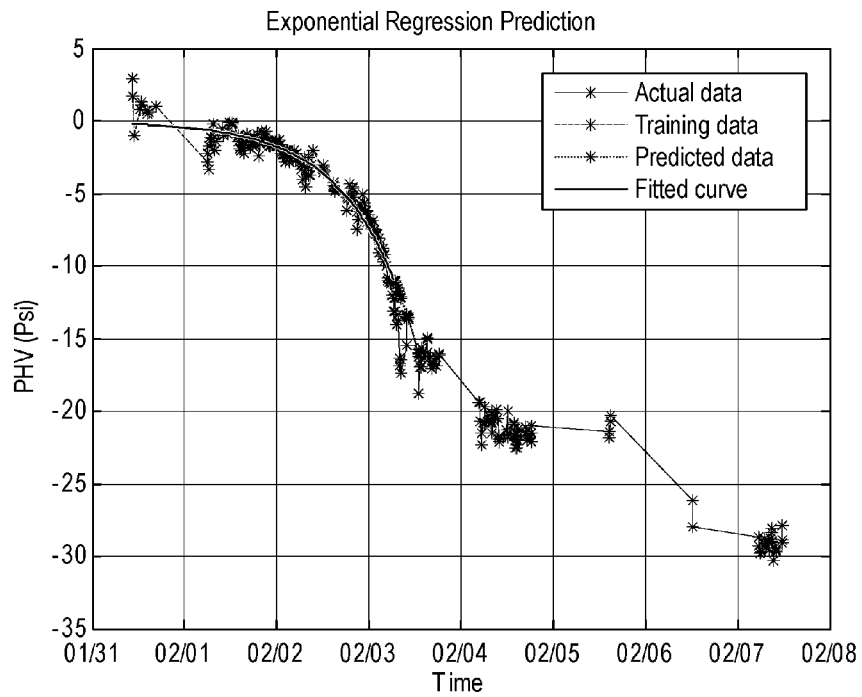
Figure 21A:
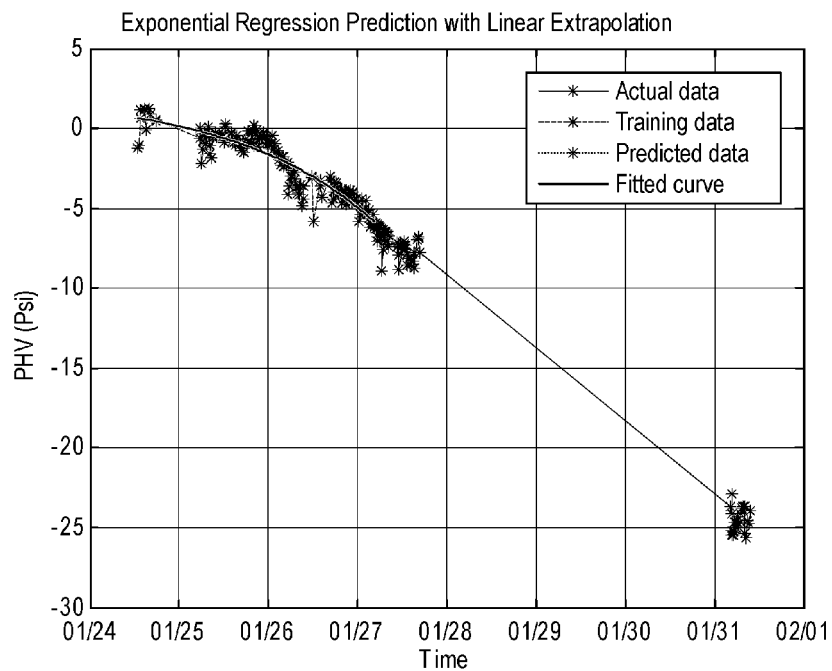
FIGS. 21A and 21B are respective graphs illustrating the application of an example exponential prediction model with linear extrapolation to the example datasets of FIGS. 18A and 18B.
Figure 21B:
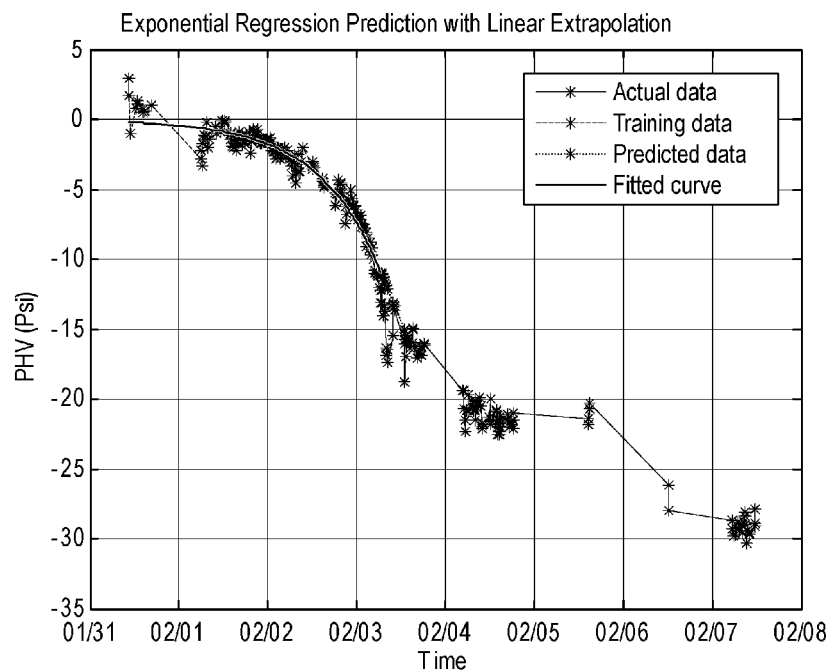

FIGS. 20A and 20B respectively illustrate the application of an exponential regression model to the datapoints for Events 1 and 2, respectively, using exponential extrapolation, while FIGS. 21A and 21B respectively illustrate the application of another exponential regression model to the datapoints for Events 1 and 2, respectively, using linear extrapolation.

Exponential regression prediction may be represented in the form $f(t)=ae^{bt}$, with a constraint of the slope ab not being positive. With exponential extrapolation (FIGS. 20A and 20B), the fitted exponential equation is used for extrapolation, while with linear extrapolation (FIGS. 21A and 21B), the position/slope of the last training point is used for extrapolation.

Figure 22:
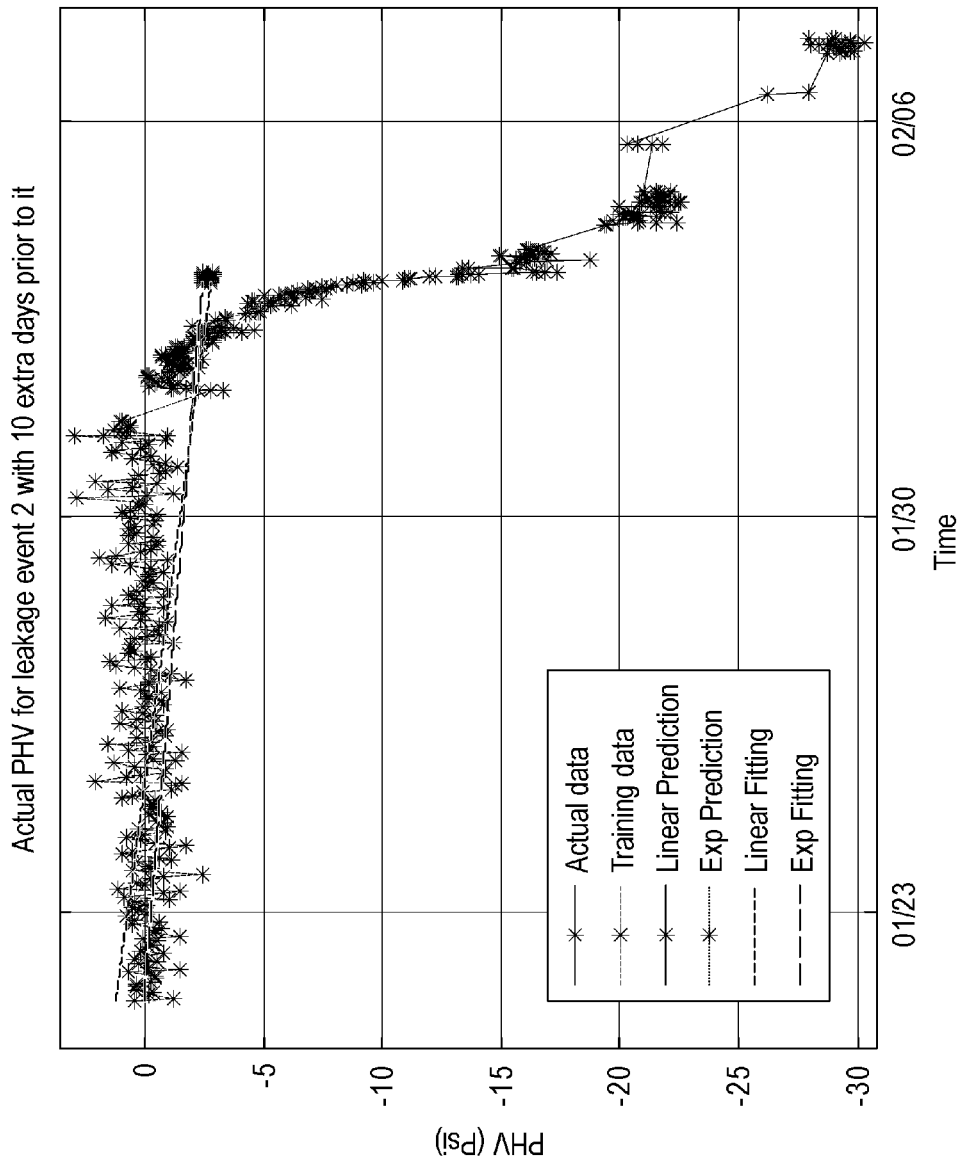
FIG. 22 is a graph illustrating a limitation of linear and exponential prediction models with datasets having greater curvature.

Both linear and exponential regression models may have limitations in some applications. For example, as illustrated in FIG. 22, if additional training data (e.g., 10 days) is used for Event 2, both models will provide relatively poor prediction results. In some applications, it may be desirable to improve fitting by only using a portion of the datapoints as training data to reduce the likelihood of a large curvature being in the training data set (e.g., by using only the last 50, 150, 250, etc. datapoints as the training data).

Another predictive technique that may be used is piecewise regression, which is often used to model systems that have sudden condition changes within the data. With piecewise regression, different conditions are modeled by different pieces of a model, and typically a global least square estimation is used to optimize the model fitting performance over all pieces. Connection points between two pieces and/or the left/right-most points on a curve are considered as knots, and the number and location of knots are typically positioned to maximize model performance. Both may be decided upfront or computed using optimization models.

Two example piecewise regression models discussed hereinafter (cubic spline and piecewise linear) use 6 as the maximum number of knots, such that the training data may be truncated up to 5 pieces and modeled separately. In addition, the exact number of knots may be optimized in some embodiments using general cross validation, which is discussed in greater detail below.

The locations of knots may be optimized by the model itself, such that the curvatures in the training dataset are better modeled, and furthermore a better prediction may be generated.

Among other techniques, a Multivariate Adaptive Regression Splines (also known as MARS) technique may be used to build the piecewise regression models.

With the MARS technique, the final model typically takes the form $f(x)=\Sigma_{i=1}^{n}w_{i}B_{i}(x)$, where a plurality (n) of basis functions $B(x)$ are each weighted by a corresponding weight $w_i$. Each basis function typically may be implemented as a constant term, a hinge function, or a multiplication of multiple hinge functions. A hinge function is a piecewise function that typically takes either the form max(0,c−x) or max(0,x−c), where c is a constant corresponding to a knot.

The model building process is similar to a stepwise regression which usually has two phases: forward selection and backward deletion. During forward selection, the training data set is segmented into multiple disjoint pieces until an acceptable minimized model error is achieved. The model is initialized by having only one term, which is the mean of all the training data. Then it employs a greedy algorithm and keeps searching for a next knot (the break point between two pieces) to segment a next piece and add a next basis function pair that gives the most reduction to the overall model training error in terms of sum of squared error. Basis functions are typically added to the model until a preset criteria is met, e.g., where the training error is smaller than a preset value, where before and after adding the next basis function, the reduction in model error is smaller than a preset value, or where the number of basis functions reaches a preset limit.

In the backward deletion phase, the least effective adjacent pieces of model from forward selection are combined to increase the model's generalization. A General Cross Validation (GCV) value may be used to consider both the model's fitting performance and complexity, with a goal to minimize the GCV over all of the pieces:

$$GCV = \frac{MSE_{training}}{\left[1 - \frac{k + \frac{d(k-1)}{2}}{n}\right]^2}$$

where k is the number of basis functions, d is a penalty for every knot (e.g., 2), and n is the number of training data points.

Figure 23A:
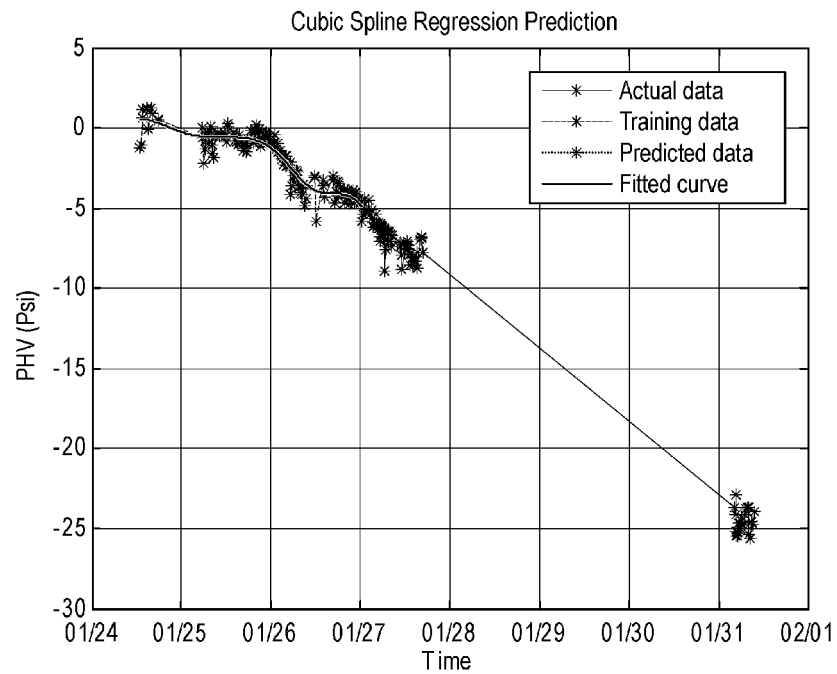
FIGS. 23A and 23B are respective graphs illustrating the application of an example cubic spline prediction model to the example datasets of FIGS. 18A and 18B.
Figure 23B:
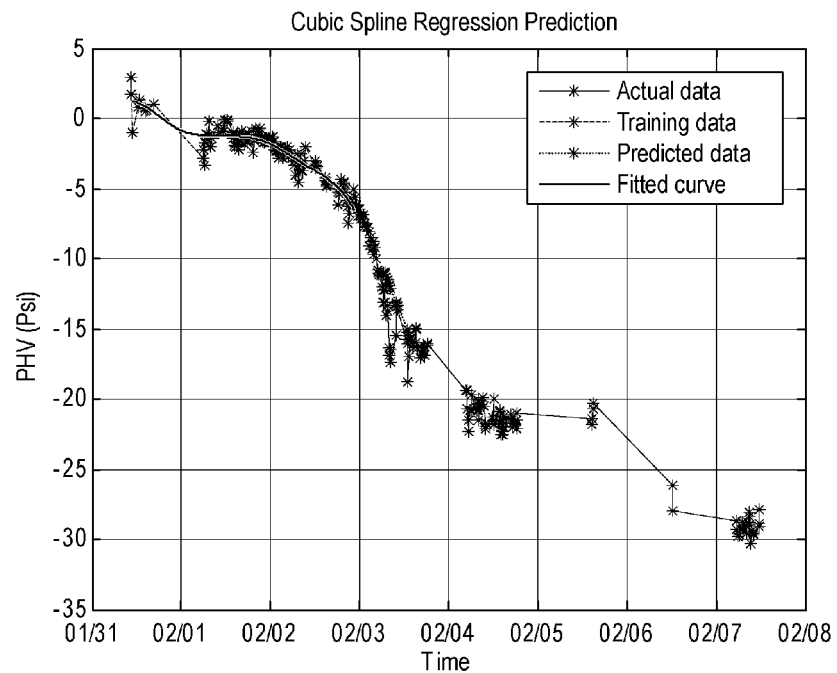

A cubic spline model is a third order polynomial piecewise regression model, where each piece may be represented by an equation taking the form $f_i(t)=a_i+b_it+c_it^2+d_it^3$, and constrained such that everywhere on the line, the line/slope/curvature is continuous and the slope is not positive. In this example, 6 knots are used, and prediction is based on a linear extrapolation using the slope and location of the last (right-most) training point. FIGS. 23A and 23B, for example, illustrate the application of such a cubic spline model to the datapoints for Events 1 and 2, respectively.

Figure 24A:
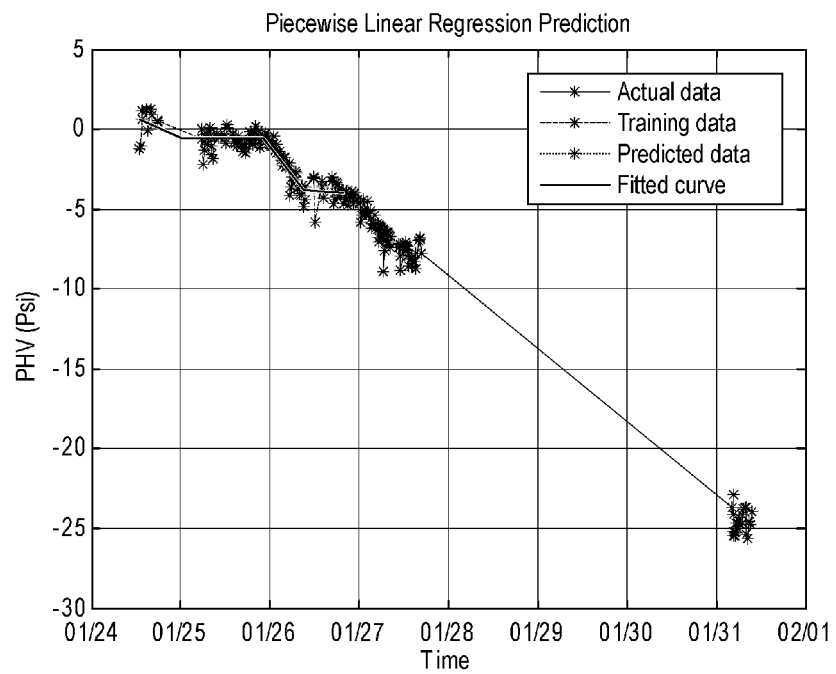
FIGS. 24A and 24B are respective graphs illustrating the application of an example piecewise linear prediction model to the example datasets of FIGS. 18A and 18B.
Figure 24B:
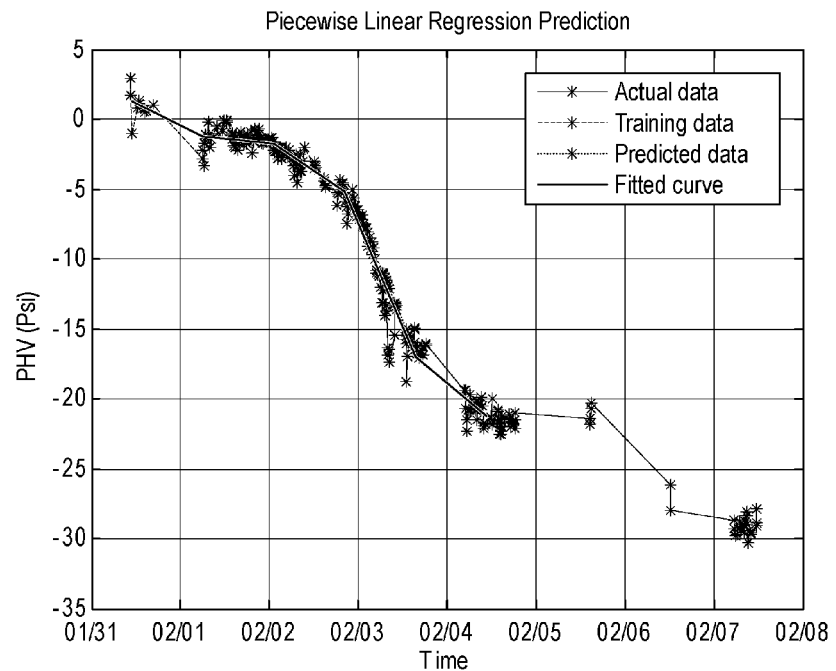

A piecewise linear model, in contrast, is a first order polynomial piecewise regression model, where each piece may be represented by an equation taking the form $f_i(t)=a_i+b_it$, and constrained such that everywhere on the line, the line is continuous and the slope is not positive. In this example, 6 knots are used, and prediction is based on a linear extrapolation using the slope and location of the last (right-most) training point. FIGS. 24A and 24B, for example, illustrate the application of such a piecewise linear model to the datapoints for Events 1 and 2, respectively.

Based on the foregoing, five models' performance (linear, exponential with exponential extrapolation, exponential with linear extrapolation, cubic spline and piecewise linear) may be compared using a fixed size moving window (20 steps ahead) Root Mean Squared Error (RMSE) value based on the predicted results for both of Events 1 and 2. Prediction may be started right after a leakage is detected and may be updated every time new measurement is received (i.e., every time a new measurement is added into the training data set). Therefore, an array of RMSE values may be generated for every model between the detection and the fixation (end) of a leakage.

Figure 25A:
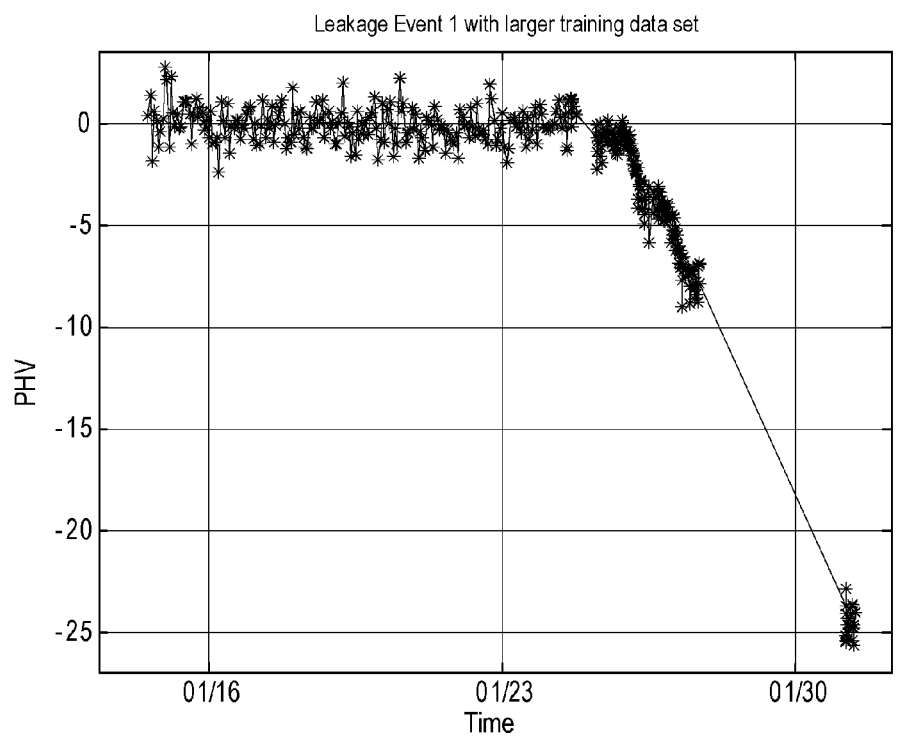
FIGS. 25A and 25B are respective graphs of two example large datasets associated with the two leakage events (respectively designated Event 1 and Event 2) referenced in FIGS. 18A and 18B.
Figure 25B:
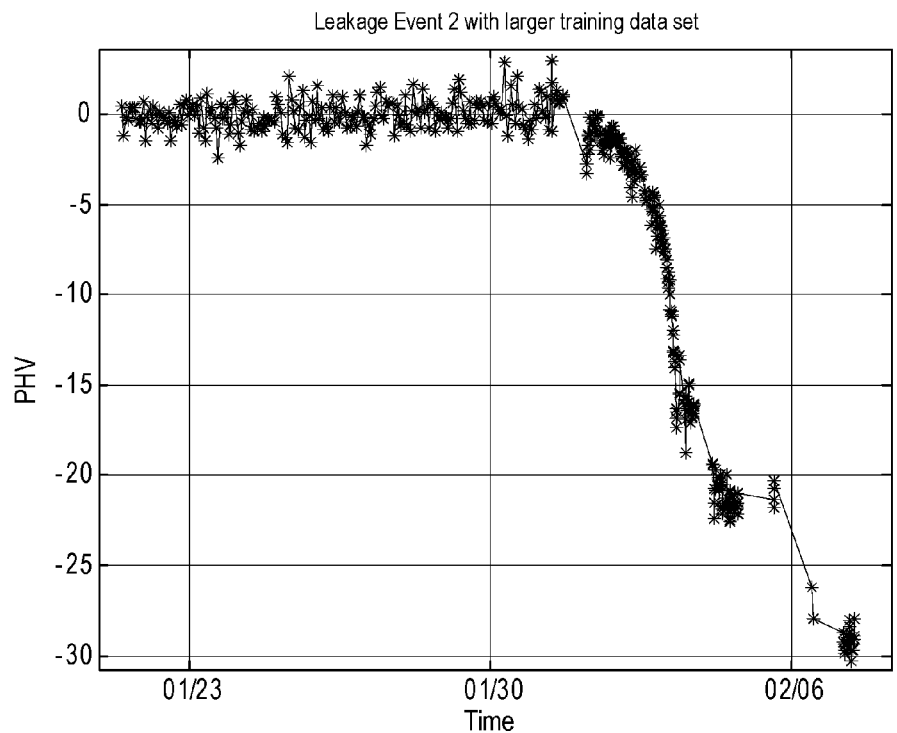

The training data set may include all of the PHV values that are generated in the manner disclosed above since last time the prediction model was retrained (model retraining may be triggered, for example, by tire inflation/replacement). Since the duration from the last retraining to the beginning of a leakage varies, the major composition of training data may vary. If a leakage starts right after model retraining, the majority of training data is collected after the leakage starts, while if a leakage starts several days after the last model retraining, the training data set may include more data collected before the leakage starts. For the purposes of this discussion, both small (i.e., most data after leakage starts) and large (i.e., most data before leakage starts) training datasets are used respectively for both of the aforementioned leakage events. The previously-discussed FIGS. 18A and 18B, for example, illustrate example small training data sets for Events 1 and 2, respectively, while FIGS. 25A and 25B illustrate example large training data sets for Events 1 and 2.

Figure 26A:
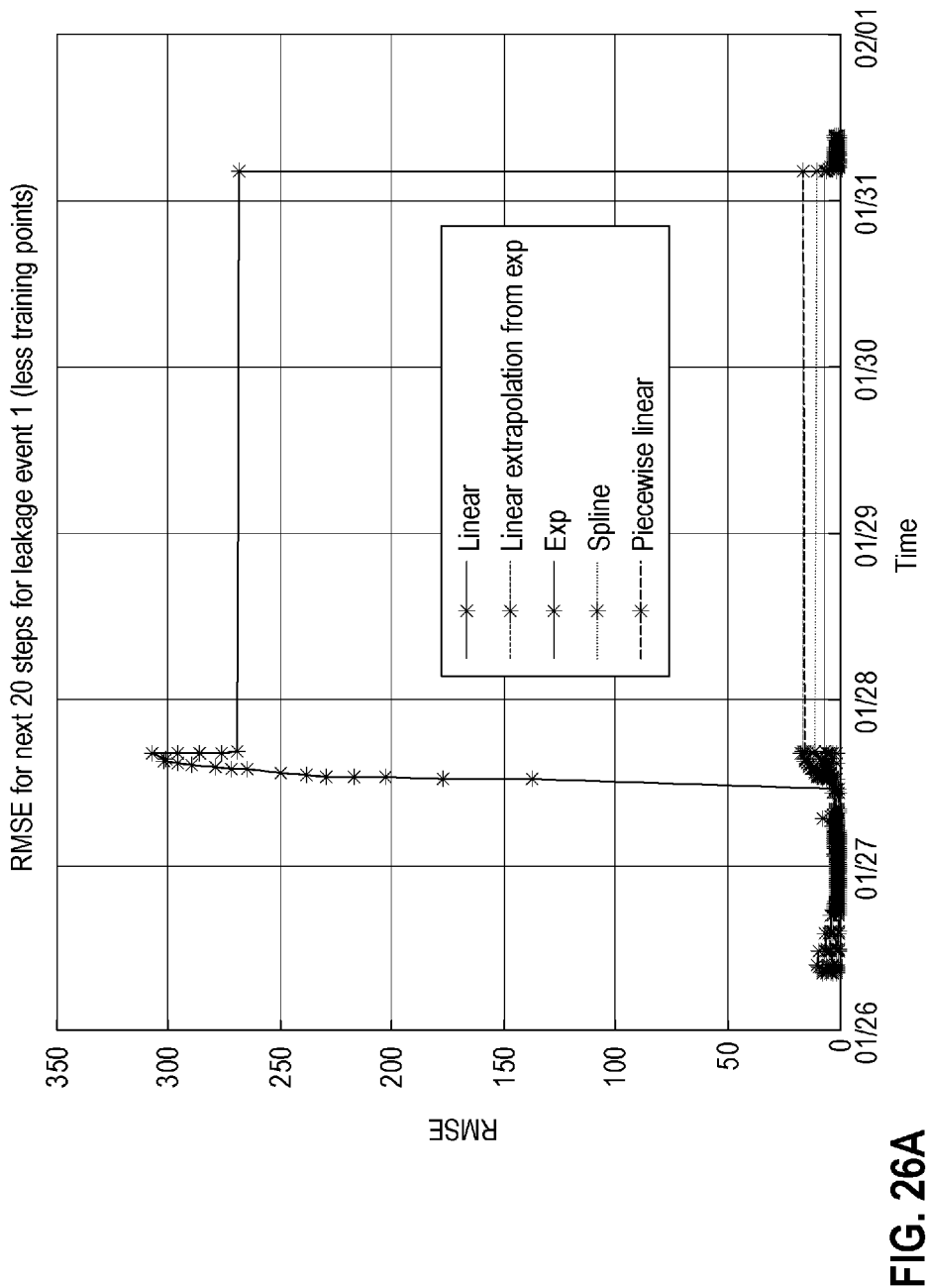
FIGS. 26A and 26B are respective graphs illustrating the comparative performance of linear, exponential, cubic spline and piecewise linear prediction models using the example datasets of FIGS. 18A and 18B.
Figure 26B:
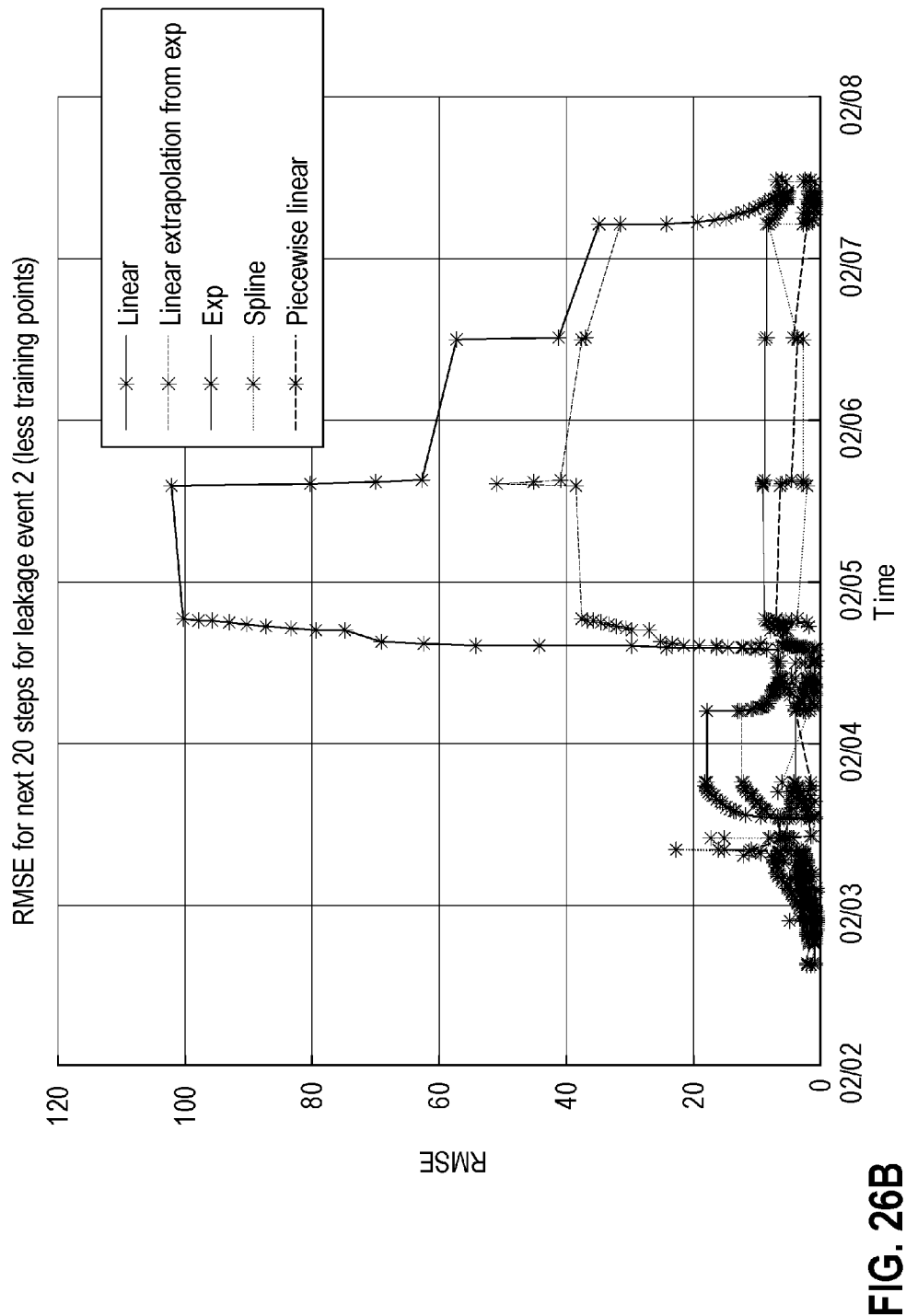

FIGS. 26A-26B illustrate the comparative performance (in terms of RMSE) of the five aforementioned models for the small training set for Events 1 and 2, respectively. FIG. 26A illustrates that for Event 1 and the small training set, the exponential with exponential extrapolation model lags the performance of the other four models. FIG. 26B illustrates that for Event 2 and the small training set, where the data forms a trend with more curvature, the linear, cubic spline and piecewise linear models perform better than the exponential models.

Figure 26C:
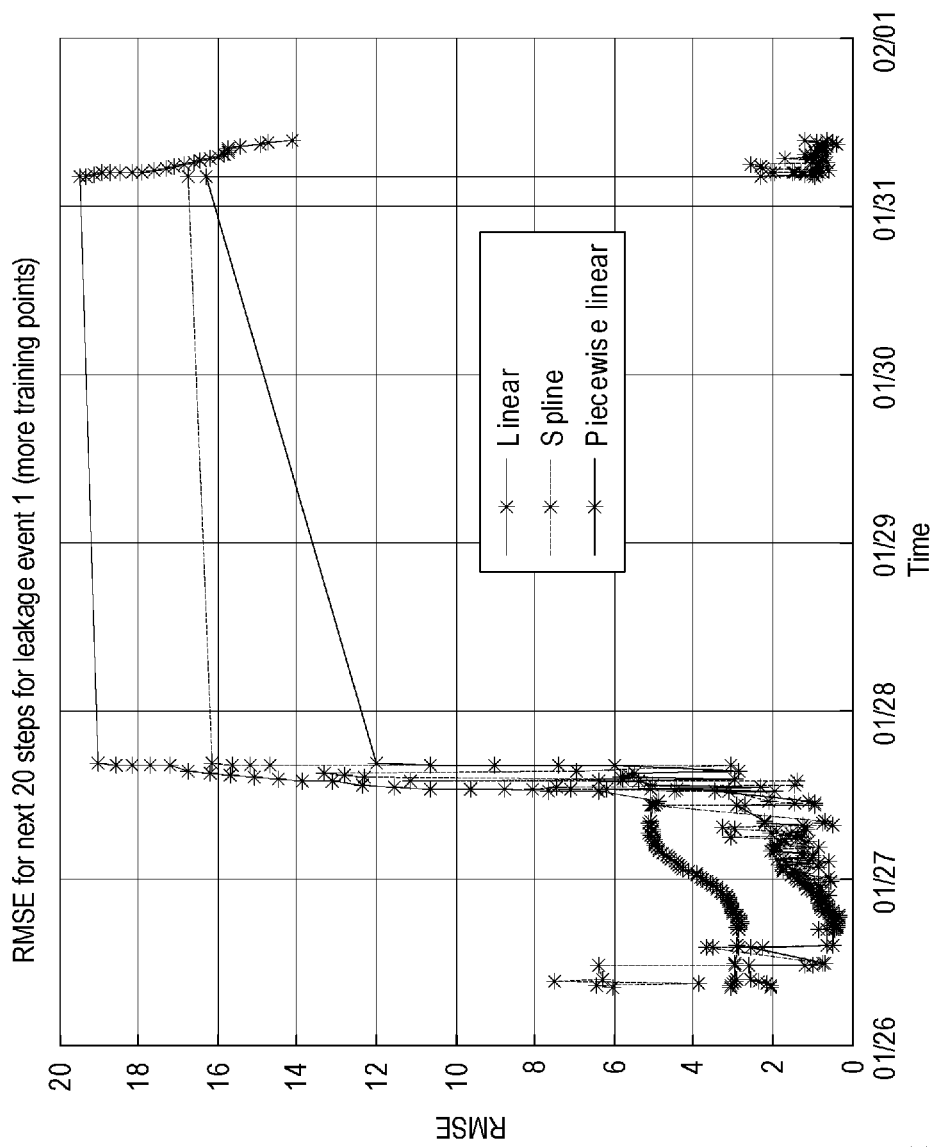
FIGS. 26C and 26D are respective graphs illustrating the comparative performance of linear, cubic spline and piecewise linear prediction models using the example datasets of FIGS. 25A and 25B.
Figure 26D:
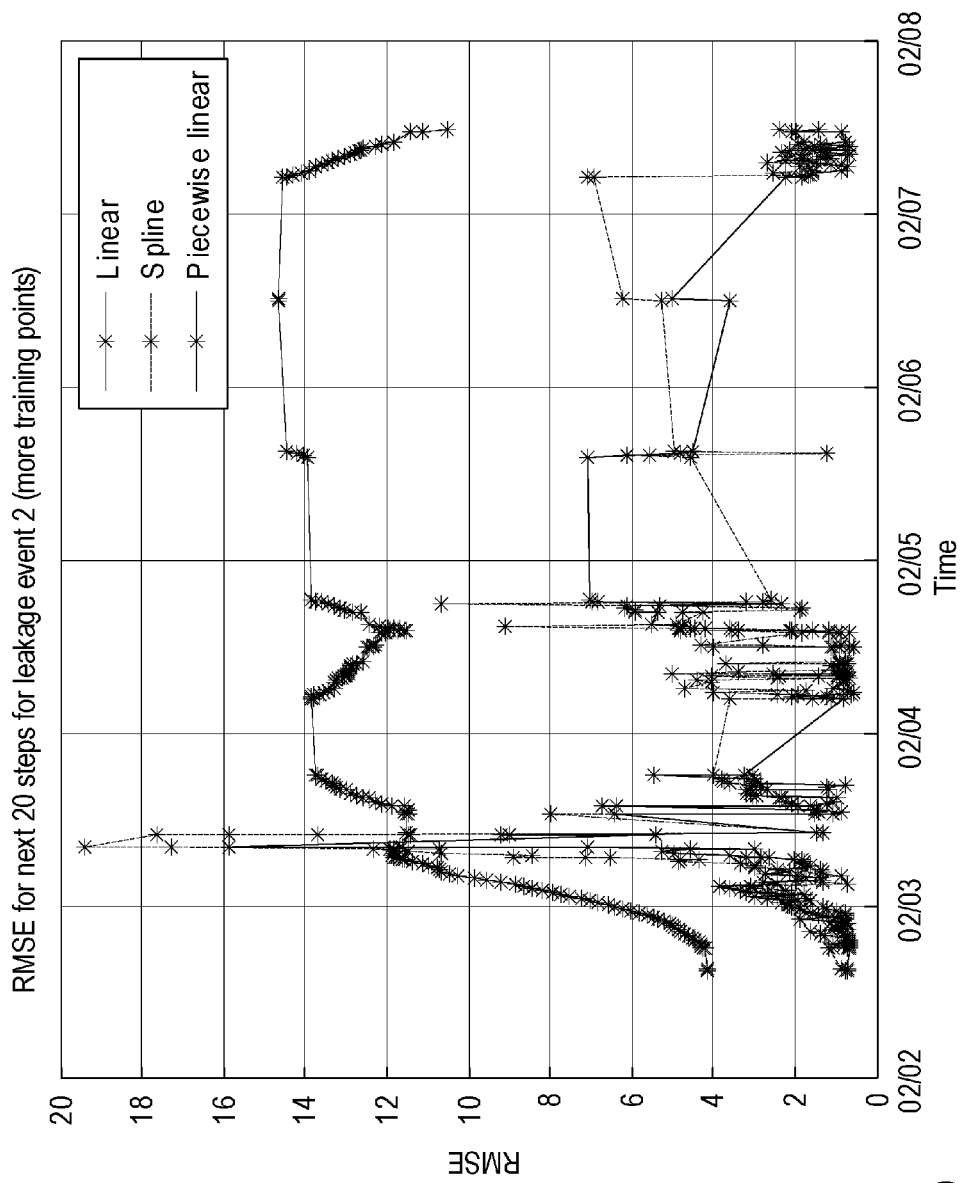

FIGS. 26C-26D illustrate the comparative performance (in terms of RMSE) of only the linear, cubic spline, and piecewise linear models for Events 1 and 2, respectively. In general, for the large training set, the cubic spline and piecewise linear models perform better than a linear model. In addition, since the tire leakage trend is often relatively noisy, it is believed that the cubic spline model may, in some instances, be too flexible (compared to piecewise linear), and may take a longer time to train (given that it is third order vs. first order), so in some embodiments, a piecewise linear regression model may be desirable for use in slow leakage prediction.

It will be appreciated, however, that alternative regression or extrapolation algorithms may be used to predict future inflation levels of a tire, including, for example, Autoregressive Moving Average (ARMA), linear regression, polynomial regression, quadratic regression, exponential regression, exponential regression with linear extrapolation, spline regression, piecewise linear regression, neural networks, Kalman filters, particle filters, similarity based prediction, etc. It will also be appreciated that in some embodiments, it may be desirable to apply one or more denoising techniques to improve model accuracy, e.g., by downsampling (e.g., by taking a mean of several datapoints) and/or upsampling (e.g., by interpolating between datapoints) a dataset.

Furthermore, in some embodiments, it may be desirable to utilize multiple regression models in cooperation with one another, e.g., fusing linear regression together with quadratic and exponential regression, with linear regression responsible for straight line prediction and quadratic and exponential regression used for changing slope curve fittings. The fusion rules may be based on expert knowledge of the shapes of the training dataset and predicted samples, e.g., based on the knowledge that the curve shape of a degrading tire should not keep going up, and may be used to combine and/or select the various types of regressions at different points.

Based upon the determined predictions, various embodiments may provide alerts and prediction-related information to a vehicle operator, a vehicle or fleet owner, a service or maintenance provider, and/or a third party so that, for example, tire maintenance operations may be automatically or manually scheduled. For example, tires may be scheduled for repair or replacement. In addition, the prediction-related information may be used, for example, to determine how long a tire will be able to be used before it requires inflation, repair and/or replacement.

It will also be appreciated that while the illustrated embodiments utilize tire data such as pressure, temperature and timestamps, additional data, such as ambient temperature, tread depth, additional temperatures taken at different points on a tire, rim or wheel, vibration, etc. may also be used in a tire monitoring system consistent with the invention. Therefore, the invention is not limited to the particular embodiments discussed herein.

Working Example

For a further explanation of the herein-described monitoring and prediction functionality, a real world dataset, taken from 10 tractor-trailer combinations (i.e., 18 tires from each truck) used in the less than truck load (LTL) shipping business (i.e., all cargos from one truck come from various locations and are also distributed to various locations), were analyzed. Each truck was provided with a TPM system that acquired data from all 18 tires, with measurements taken about every 30 seconds when tires were rotating (detected by accelerometers), and collected about every 16 minutes. The collected data was manually downloaded, and from that data, a relative time stamp, temperature and pressure for each tire at each collection interval were extracted for analysis. In general, approximately 7 months worth of data was collected for each truck.

In order to simulate real time conditions using offline data, an iterative algorithm was used, such that one data package was loaded into the system and processed at a time. If an unhealthy tire was detected, an alarm would be set, and otherwise, the next iteration would begin.

From the standpoint of anomaly detection on healthy tires, the input variables to the entire system were temperature, pressure and time. It was found, however, that due to large gaps in the data, whether due to nights or weekends when trucks were not operating, data visualization could be improved by plotting data points against their indices rather than time.

Figure 27:
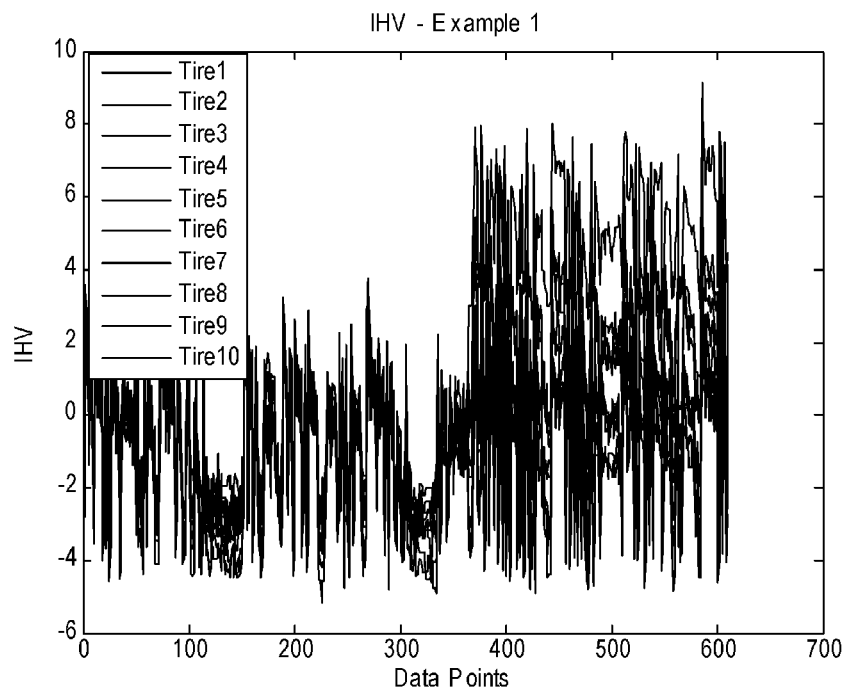
FIG. 27 is a graph of individual health values for ten tires on a vehicle in an example data set.

It was found, for example, that the use of an anomaly detection feature permitted an anomaly, in particular the inflation of multiple tires on a vehicle, to be detected. FIG. 27, for example, illustrates an example IHV plot for a set of ten tires on a vehicle. In addition, this figure shows that the IHV's of different tires before point 365 are close to each together, but are separated after passing point 365.

Figure 28A:
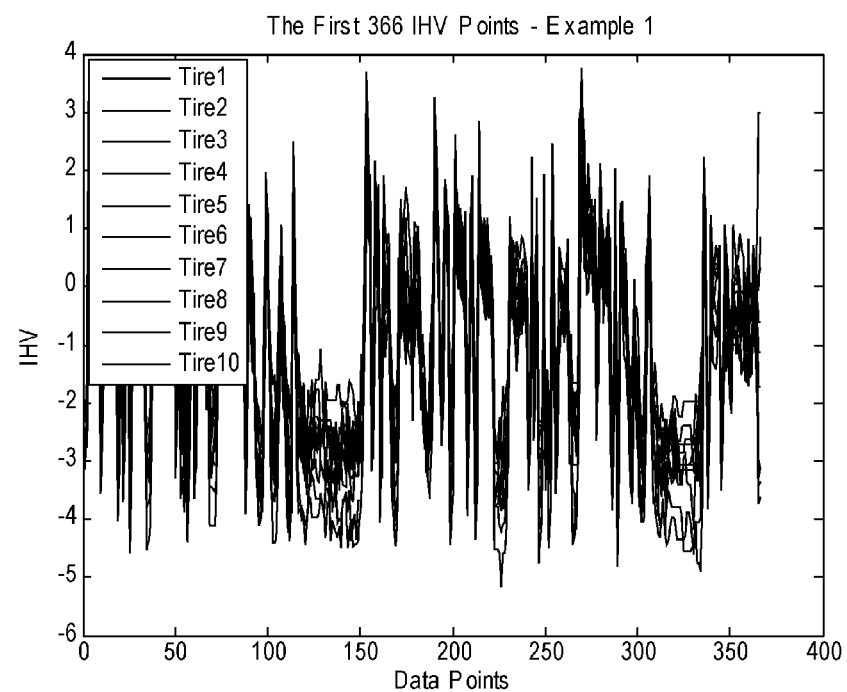
FIG. 28A is an enlarged view of a portion of the graph of FIG. 27.
Figure 28B:
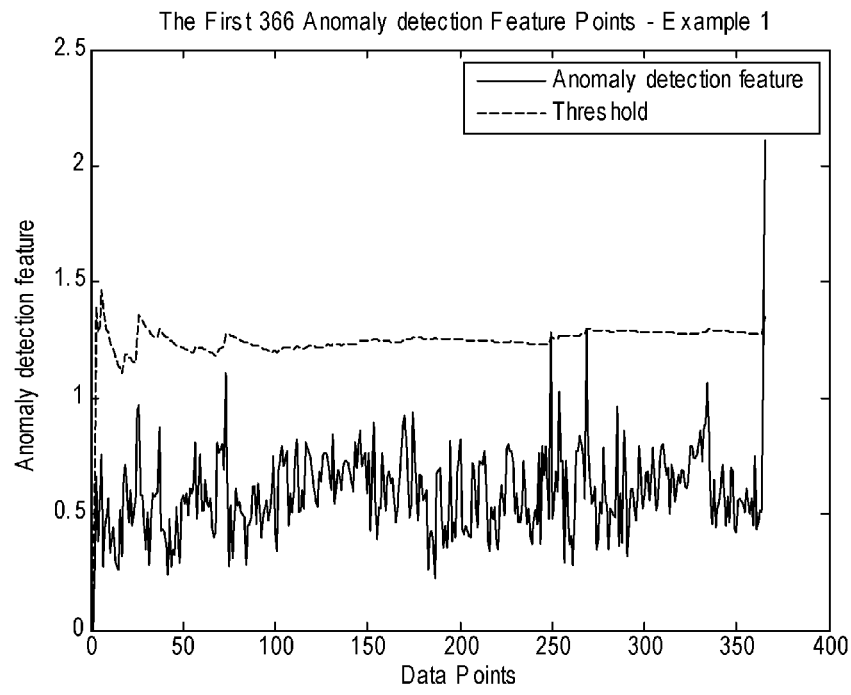
FIG. 28B is a graph of an anomaly detection feature corresponding to the portion of the graph of FIG. 28A.

From a real time system perspective, it is desirable for this event to be detected relatively soon after it happens. So it makes more sense to take a look at the IHV before point 366 (including 366, one data point after the inflation happens) which is shown in FIG. 28A. While it may be difficult to visualize the change of point 365 from its previous points, by applying the anomaly detection feature discussed above, e.g., by calculating the standard deviation of PHV among healthy tires (e.g., as shown in FIG. 15A), change is easier to visualize. The anomaly detection feature is shown in FIG. 28B, and illustrates where two consecutive feature data points (points 365, 366) were over the threshold indicating a system anomaly is detected.

Figure 29A:
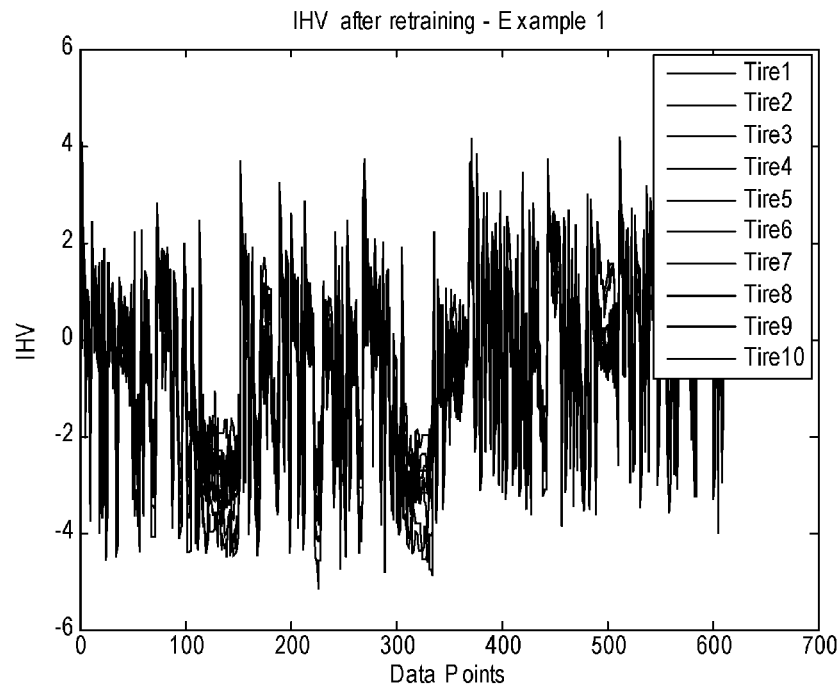
FIGS. 29A and 29B are respective graphs of individual and peer-based health values for ten tires on a vehicle in an example data set after retraining.
Figure 29B:
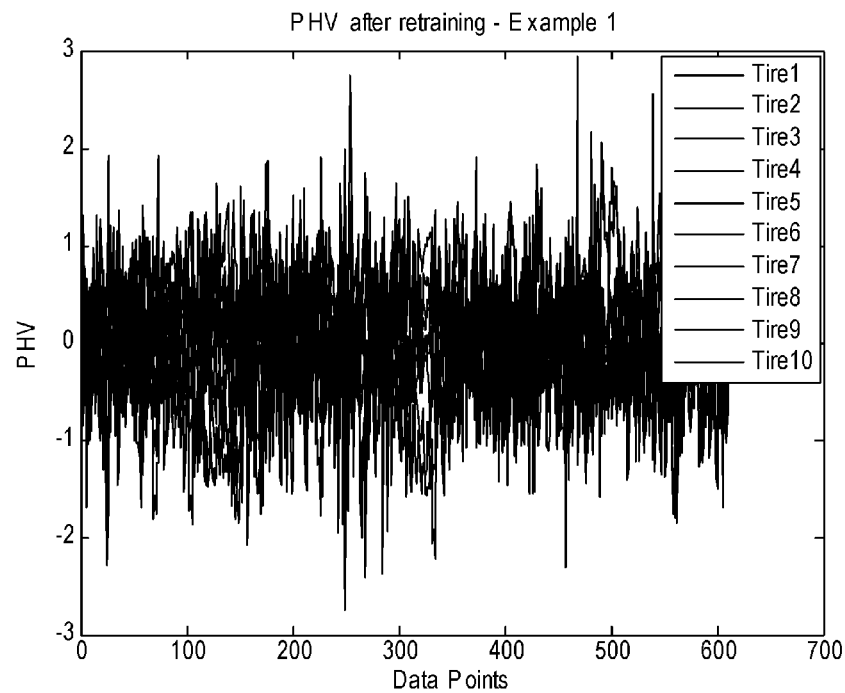

Thereafter, through recalculation of the anomaly detection feature without the tire with the minimum IHV, as discussed above, similar feature values that were above the threshold were also found at points 365 and 366, and thus the cause of the system anomaly was categorized to inflation. In addition, the anomaly diagnosis feature showed that more than two tires were inflated, and as such, health assessment models on all tires were retrained. After retraining, including both tire self-comparison and peer-based comparison, the IHV's of all tires were bonded together and the PHV's returned back to a value around zero, indicating that the health condition remained good. FIGS. 29A and 29B respectively show IHV's and PHV's after retraining, and it should be noted that though after inflation more air was pumped into tires, the tires were still indicated to be at substantially the same health condition as before. As such, the tires' health conditions did not change based upon the amount of air in each tire. The PHV's in FIG. 29B were all around 0, which indicated the tires were in equally good condition both before and after the inflation event. Therefore, after model retraining, PHV continued to accurately reflect the health conditions of all tires.

It was therefore found that reducing the variance within the good condition group by bringing tires from different inflation levels to the same health condition and extracting their similar working regime effect out of the data facilitated the detection of a possible bad tire condition. Furthermore, system changes such as inflation events were accurately detected.

Figure 30:
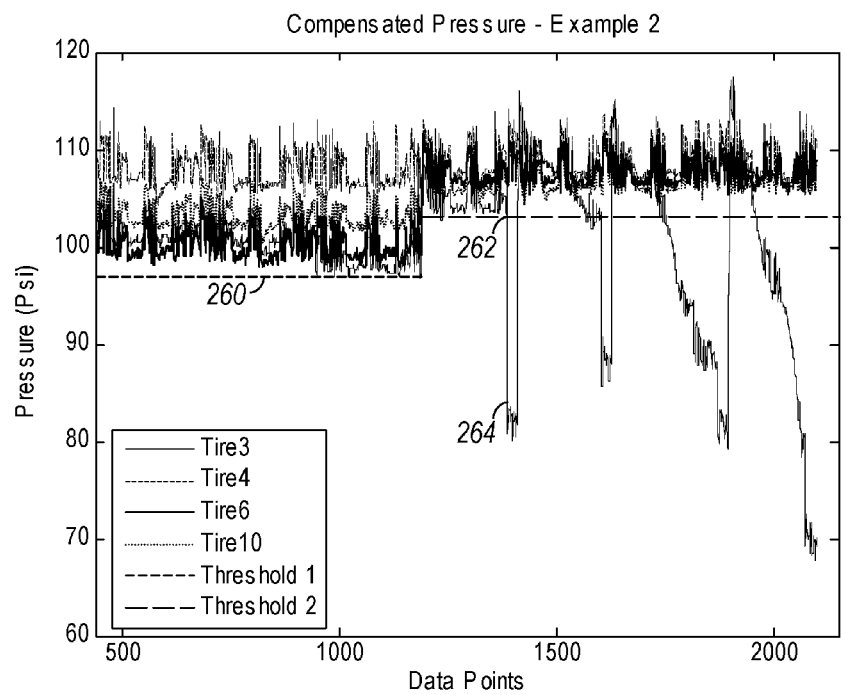
FIG. 30 is a graph of compensated pressure for four tires on a vehicle in an example data set.

Next, from the standpoint of leakage detection and prediction, the same dataset was utilized to attempt to detect a slow leakage and predict the leakage rate of the leaking tire. FIG. 30, for example, illustrates a plot of compensated pressure of four tires from a truck in the dataset. In order to detect leaking tires while not generating too many false alarms, thresholds below the lowest normal tire pressures were set. Also, it was known that some of the four tires were inflated at data point 1189 and two different thresholds needed to be set to detect tire leakage. Before the inflation a threshold 260 of 97 psi was set while a threshold 262 after the inflation was set at 103 psi. Using compensated pressure, a leakage from tire 3, shown in plot 264, was initially detected at point 1387, where its pressure had the first large drop.

Figure 31:
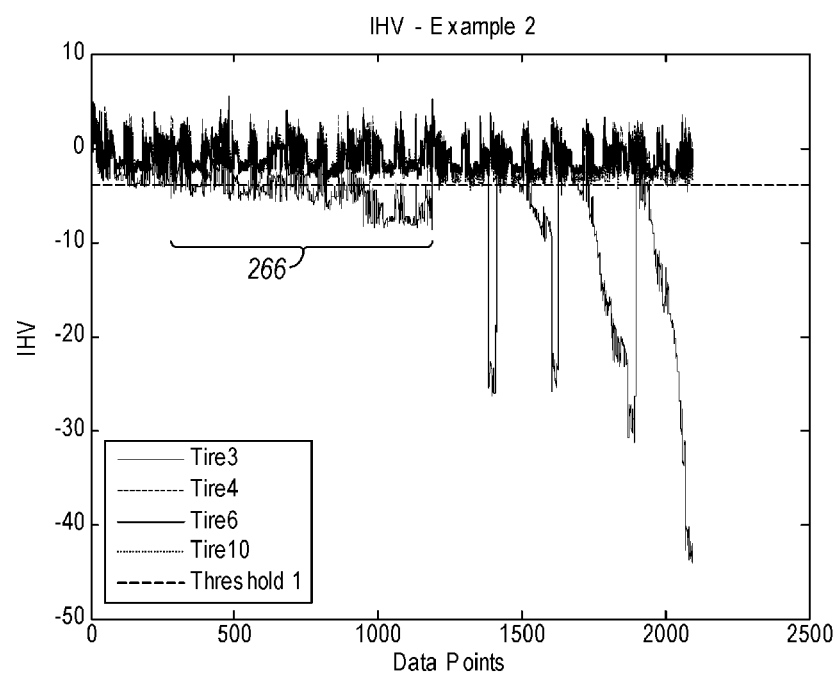
FIG. 31 is a graph of individual health values for four tires on a vehicle in an example data set.
Figure 32:
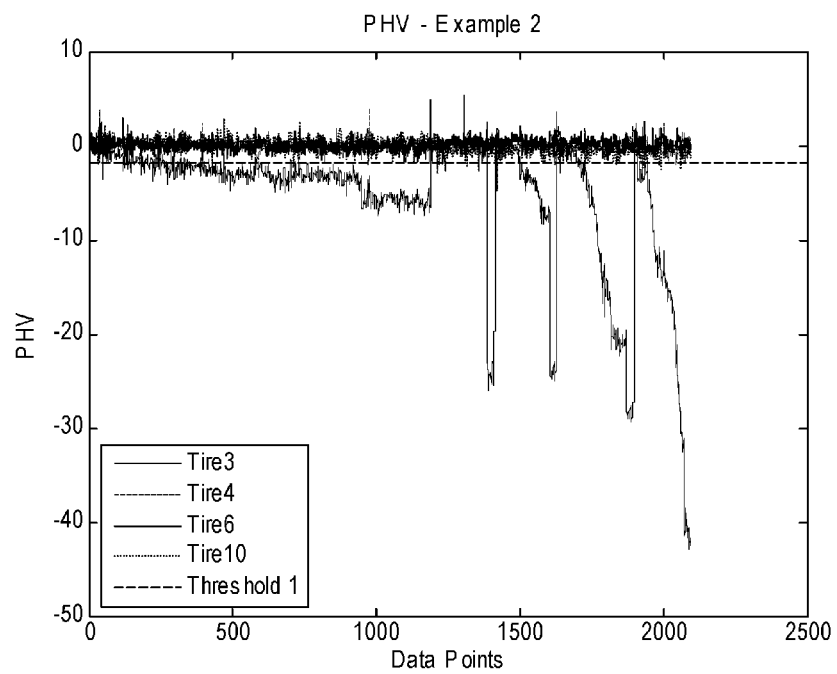
FIG. 32 is a graph of peer-based health values for four tires on a vehicle in an example data set.

However, by applying the aforementioned prediction algorithm, earlier leakage detection was achieved. First, through the tire self-comparison, inflation detection, and model retraining, it was found that only one unique threshold was needed for any tire at any time, as is shown in FIG. 31. Also a slow leakage that could not be observed from compensated pressure is shown at 266 in the IHV plot, and the leaking tire detection time could be moved to a much earlier point in time, e.g., around point 300. Then, after peer-based comparison is conducted, a smaller data variance within each tire is obtained, as shown in FIG. 32, and the leakage detection time may be further advanced to around point 120. In addition, since the leakage was not severe when it was initially detected, a prediction process was triggered afterwards to infer the tire's future health condition.

Various additional modifications may be made without departing from the spirit and scope of the invention. Therefore, the invention lies in the claims hereinafter appended.

What is claimed is:

1. A method of monitoring vehicle tires, the method comprising:
    receiving tire data associated with a plurality of tires on a vehicle; and
    with at least one processor, determining a health condition for each of the plurality of tires, wherein determining the health condition for each of the plurality of tires includes:
        reducing variances between the plurality of tires on the vehicle by performing an individual self-comparison of the tire data for each tire; and
        reducing variances within each tire by performing a peer-based comparison of the tire data for each tire.

2. The method of claim 1, wherein the tire data includes temperature and pressure data for each of the plurality of tires and taken at a plurality of times.

3. The method of claim 2, wherein the tire data for a first tire among the plurality of tires and taken at a first time includes a first pressure, a first temperature and a first timestamp associated with the first time.

4. The method of claim 1, wherein performing the individual self-comparison includes applying an assessment model to the tire data.

5. The method of claim 4, wherein the assessment model comprises a distance-based assessment model.

6. The method of claim 4, wherein the assessment model comprises a logistic regression model or a self-organizing map model.

7. The method of claim 4, wherein performing the individual self-comparison further includes generating an individual health value (IHV) for each tire based upon the assessment model, wherein the IHV for each tire compares a current performance of such tire with a normal performance of such tire determined during training of the assessment model.

8. The method of claim 1, wherein performing the peer-based comparison includes comparing tire data for a first tire against that of at least a subset of the plurality of tires.

9. The method of claim 8, wherein comparing the tire data for the first tire against that of the at least a subset of the plurality of tires includes comparing the tire data for the first tire against a median determined from the tire data for at least a subset of the plurality of tires.

10. The method of claim 8, wherein comparing the tire data for the first tire against that of the at least a subset of the plurality of tires includes comparing the tire data for the first tire against a mean determined from the tire data for at least a subset of the plurality of tires.

11. The method of claim 1, wherein the received tire data includes, for each tire, a raw pressure and a temperature, wherein the method further comprises determining a compensated pressure for each tire by compensating the raw pressure based upon the temperature.

12. The method of claim 1, further comprising removing at least one out-of range outlier from the tire data.

13. The method of claim 1, further comprising:
    compensating pressure data in the tire data based upon temperature data in the tire data; and
    removing at least one impossible data combination outlier from the tire data based on the compensated pressure data.

14. The method of claim 1, further comprising:
    training a tire-specific model for each tire using a plurality of data samples from a first portion of the tire data to establish a normal operating condition for each tire; and
    applying a second portion of the tire data to the tire-specific model for each tire to determine the health condition of each tire.

15. The method of claim 14, wherein training the tire-specific model for each tire includes determining a mean pressure value for each tire, and wherein applying the second portion of the tire data includes:
    determining an individual health value (IHV) for each tire based upon individual-self comparison, wherein determining the IHV for each tire includes determining a difference between a compensated pressure value and the mean pressure value; and
    determining a peer health value (PHV) for each tire based upon peer-based comparison, wherein determining the PHV for each tire includes determining a difference between the IHV for each tire and a median of IHV's for at least a subset of the plurality of tires.

16. The method of claim 14, wherein training the tire-specific model is performed in a training mode for the tire-specific model and applying the second portion to the tire data is performed in a testing mode for the tire-specific model, the method further comprising, in response to detecting an anomaly for a tire, returning the tire-specific model to the training mode to retrain the tire-specific model for the tire.

17. The method of claim 16, wherein the anomaly is a tire inflation.

18. The method of claim 1, further comprising:
    determining an anomaly detection feature; and
    detecting an anomaly based on the anomaly detection feature.

19. The method of claim 18, wherein the anomaly detection feature is a standard deviation of peer health values (PHVs) or a mean of temporal differences.

20. The method of claim 18, further comprising determining a dynamic threshold based on a historical trend of the anomaly detection feature, wherein detecting the anomaly is based on the anomaly detection feature exceeding the dynamic threshold.

21. The method of claim 18, further comprising, in response to detecting an anomaly:
determining an anomaly diagnosis feature; and
determining an anomaly type based on the anomaly diagnosis feature.

22. The method of claim 21, wherein the anomaly diagnosis feature is a difference between individual health value (IHV) and a minimum or standard deviation.

23. The method of claim 21, further comprising determining a dynamic threshold based on a historical trend of the anomaly diagnosis feature, wherein determining the anomaly type is based a number of tire for which the anomaly diagnosis feature exceeds the dynamic threshold.

24. The method of claim 23, wherein the anomaly type is selected from the group consisting of a severe leakage, a single tire inflation, a subset of tires inflation, and an all-tires inflation, and wherein for the single tire inflation, a tire-specific model for the single tire is retrained, for the subset of tires inflation, tire-specific models for the subset of tires are retrained, and for the all-tires inflation, tire-specific models for all tires are retrained.

25. The method of claim 21, further comprising:
determining the anomaly detection feature excluding a tire with a minimum individual health value (IHV); and
detecting a severe leakage in response to a difference between the anomaly detection feature with the tire with the minimum IHV and the anomaly detection feature excluding the tire with the minimum IHV.

26. The method of claim 1, further comprising predicting leakage in a tire based on historical peer health values (PHVs) of the tire.

27. The method of claim 26, wherein predicting leakage includes performing at least one of linear, exponential, cubic spline and piecewise linear regression.

28. The method of claim 26, wherein predicting leakage includes performing piecewise linear regression to predict a future PHV.

29. The method of claim 26, wherein predicting leakage includes building a prediction model using Multivariate Adaptive Regression Splines (MARS) regression analysis to minimize root mean square error (RMSE) in the prediction model.

30. The method of claim 1, further comprising detecting a slow leakage in a tire based on peer health values (PHVs) of the tire over a plurality of iterations, wherein detecting the slow leakage includes, during each iteration:
comparing a PHV of the tire against a first threshold criterion;
accumulating a count for the tire if the PHV of the tire meets a first threshold criterion; and
resetting the count for the tire if the PHV of the tire does not meet the first threshold criterion.

31. The method of claim 30, wherein detecting the slow leakage further comprises:
comparing the count against a second threshold criterion;
determining an initial slow leak level from a PHV of the tire if the count meets the second threshold criterion; and
triggering a slow leak event in response to meeting a third threshold criterion relative to the initial slow leak level.

32. The method of claim 1, further comprising detecting recovery of a tire based on historical peer health values (PHVs) of the tire, wherein detecting recovery of the tire comprises:
comparing a current PHV of the tire against a threshold criterion; and
triggering a tire recovery event in response to the current PHV of the tire meeting the threshold criterion.

33. An apparatus, comprising:
at least one processor; and
program code configured upon execution by the at least one processor to monitor vehicle tires by receiving tire data associated with a plurality of tires on a vehicle, and determining a health condition for each of the plurality of tires, wherein the program code is configured to determine the health condition for each of the plurality of tires by:
reducing variances between the plurality of tires on the vehicle by performing an individual self-comparison of the tire data for each tire; and
reducing variances within each tire by performing a peer-based comparison of the tire data for each tire.

34. The apparatus of claim 33, wherein the tire data is generated locally on the vehicle, and wherein the at least one processor is disposed in a remote monitoring service configured to receive the tire data over a network.

35. A program product, comprising:
a non-transitory computer readable medium; and
program code stored on the computer readable medium and configured upon execution to monitor vehicle tires by receiving tire data associated with a plurality of tires on a vehicle, and determining a health condition for each of the plurality of tires, wherein the program code is configured to determine the health condition for each of the plurality of tires by:
reducing variances between the plurality of tires on the vehicle by performing an individual self-comparison of the tire data for each tire; and
reducing variances within each tire by performing a peer-based comparison of the tire data for each tire.

* * * * *